(12) United States Patent
Plavetich

(10) Patent No.: US 8,052,019 B2
(45) Date of Patent: *Nov. 8, 2011

(54) VEHICLE MULTI-PURPOSE CARGO BED ACCESSORY

(75) Inventor: Richard Plavetich, Laguna Beach, CA (US)

(73) Assignee: Nissan Design America, Inc., San Diego, CA (US)

( * ) Notice: Subject to any disclaimer, the term of this patent is extended or adjusted under 35 U.S.C. 154(b) by 825 days.

This patent is subject to a terminal disclaimer.

(21) Appl. No.: 11/689,117

(22) Filed: Mar. 21, 2007

(65) Prior Publication Data

US 2008/0231075 A1    Sep. 25, 2008

(51) Int. Cl.
*B60R 9/00* (2006.01)

(52) U.S. Cl. .................. 224/403; 224/486; 224/543

(58) Field of Classification Search .............. 224/400, 224/403, 404, 484, 485, 486, 543, 544, 555, 224/564, 567, 568; 410/102, 104, 129–139, 410/150; 296/37.6

See application file for complete search history.

(56) References Cited

U.S. PATENT DOCUMENTS

| | | | |
|---|---|---|---|
| 5,564,768 A * | 10/1996 | Saffold | 296/37.6 |
| 5,649,731 A | 7/1997 | Tognetti | |
| 5,855,310 A * | 1/1999 | Van Ert et al. | 224/543 |
| 6,007,129 A * | 12/1999 | Kearney, Jr. | 296/37.6 |
| 6,059,344 A | 5/2000 | Radosevich | |
| 6,138,883 A * | 10/2000 | Jackson et al. | 224/404 |
| 6,267,429 B1 | 7/2001 | Kuzmich et al. | |
| 6,481,604 B1 * | 11/2002 | Beene et al. | 224/404 |
| 6,527,326 B2 | 3/2003 | Henderson | |
| 6,634,848 B2 | 10/2003 | Henderson | |
| 6,644,708 B1 * | 11/2003 | Grzegorzewski et al. | 296/32 |
| 6,799,927 B2 * | 10/2004 | Wheatley | 410/104 |
| 6,846,140 B2 | 1/2005 | Anderson et al. | |
| 6,851,735 B2 * | 2/2005 | Hicks et al. | 296/37.1 |
| 7,021,689 B1 | 4/2006 | Weisbeck, III | |
| 7,111,886 B1 | 9/2006 | Miller et al. | |
| 7,125,062 B2 | 10/2006 | Kiester et al. | |
| 7,214,018 B2 * | 5/2007 | Lussier | 410/130 |
| 7,273,336 B2 * | 9/2007 | Silamianos et al. | 410/135 |
| 7,281,889 B2 * | 10/2007 | Anderson et al. | 410/104 |
| 7,344,184 B2 * | 3/2008 | Salvador et al. | 296/183.1 |
| 7,413,390 B1 * | 8/2008 | Allison et al. | 410/102 |
| 7,600,954 B2 * | 10/2009 | Marcott | 410/109 |
| 2006/0222471 A1 | 10/2006 | Lussier | |
| 2006/0226189 A1 | 10/2006 | Lussier | |
| 2006/0290157 A1 * | 12/2006 | Bohlke et al. | 296/37.6 |

* cited by examiner

*Primary Examiner* — Justin Larson

(74) *Attorney, Agent, or Firm* — Global IP Counselors, LLP

(57) ABSTRACT

A multi-purpose vehicle cargo bed accessory includes a central body portion, a first lateral body portion and a mounting structure. The first lateral body portion is rigidly connected along a first lateral edge of the central body portion to form a generally T-shaped transverse cross section with the central body portion along a majority of a length of the first lateral edge. The first lateral body portion has a first longitudinal part extending outwardly from a first side of central body portion and a second longitudinal part extending outwardly from a second side of central body portion. At least one of the central body portion and the first lateral body portion includes the mounting structure configured and arranged to securely fasten the vehicle cargo bed accessory to a vehicle cargo area.

23 Claims, 18 Drawing Sheets

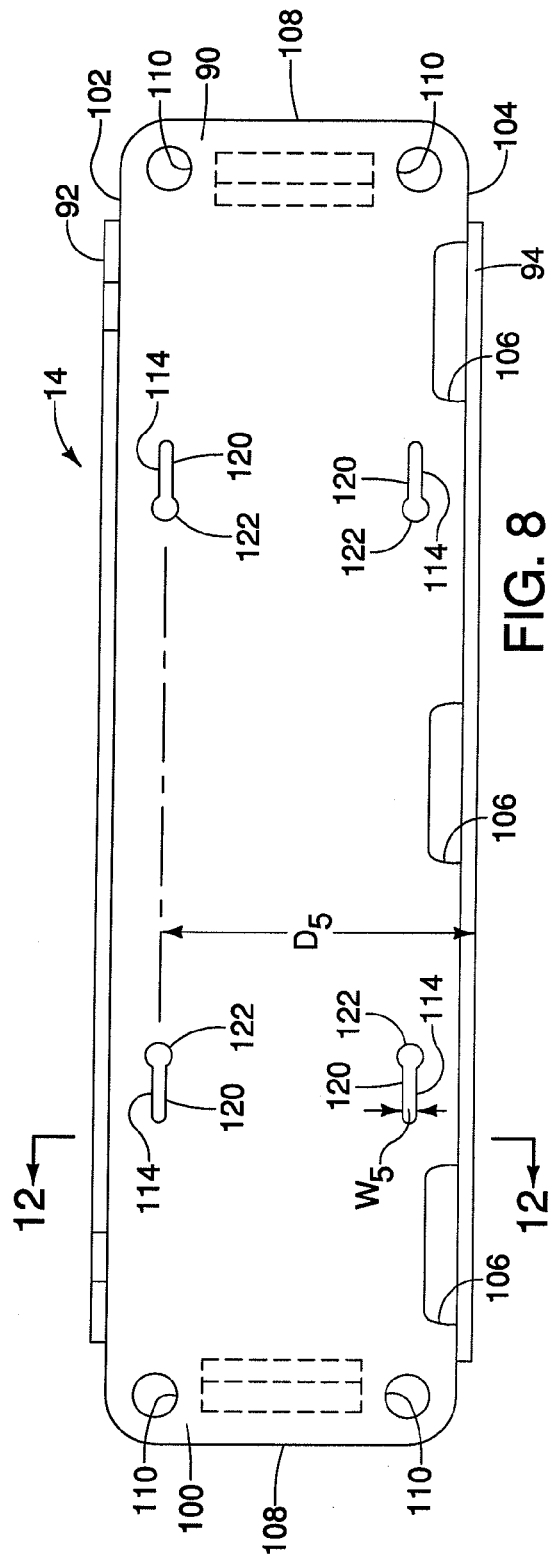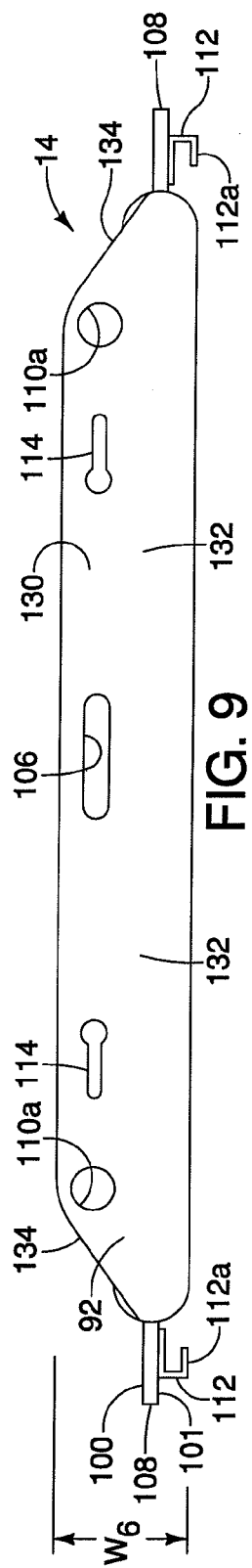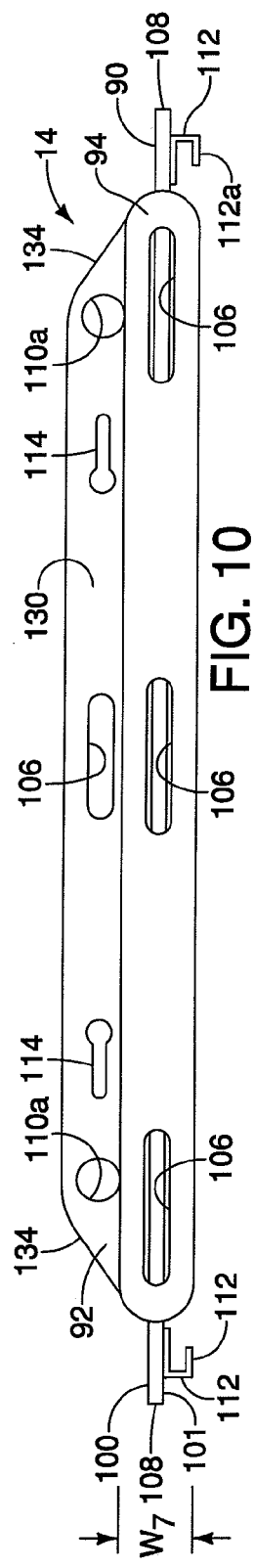

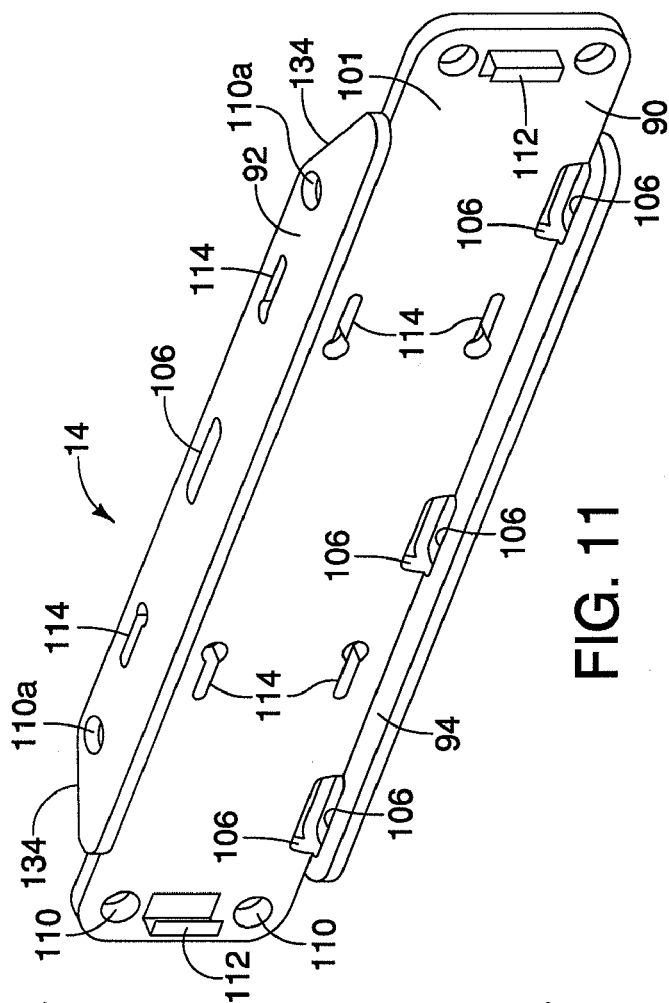
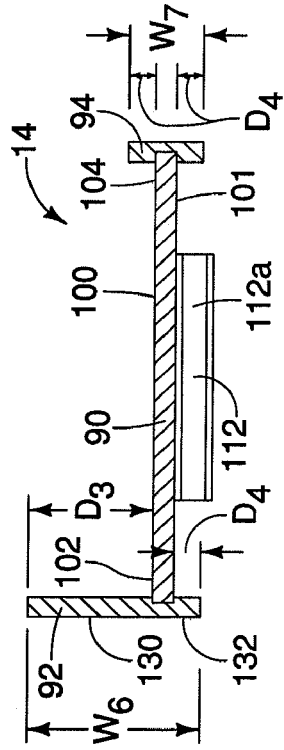
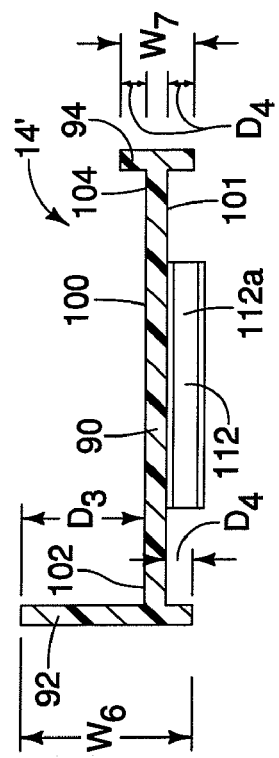
FIG. 11
FIG. 12
FIG. 13

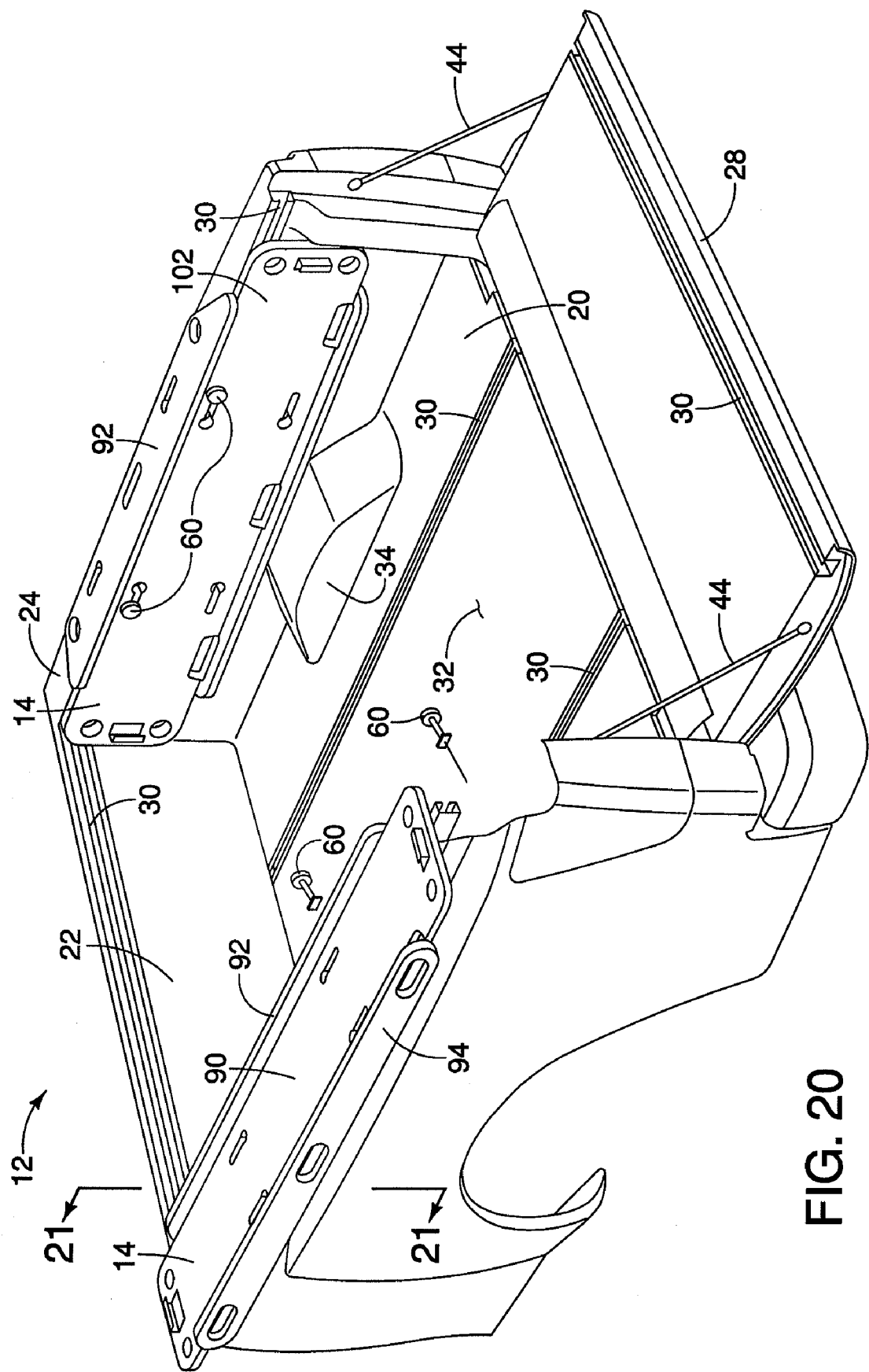

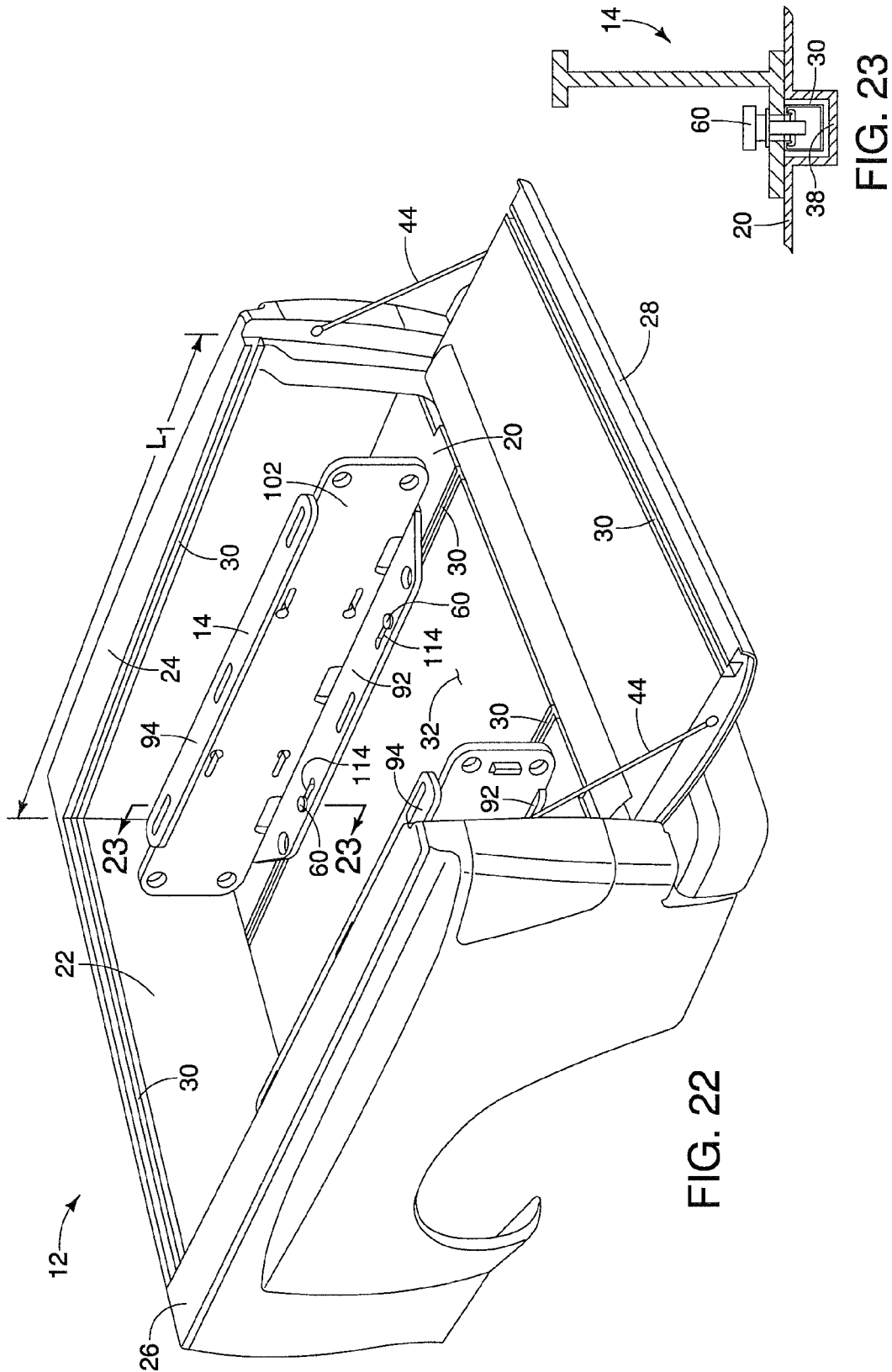

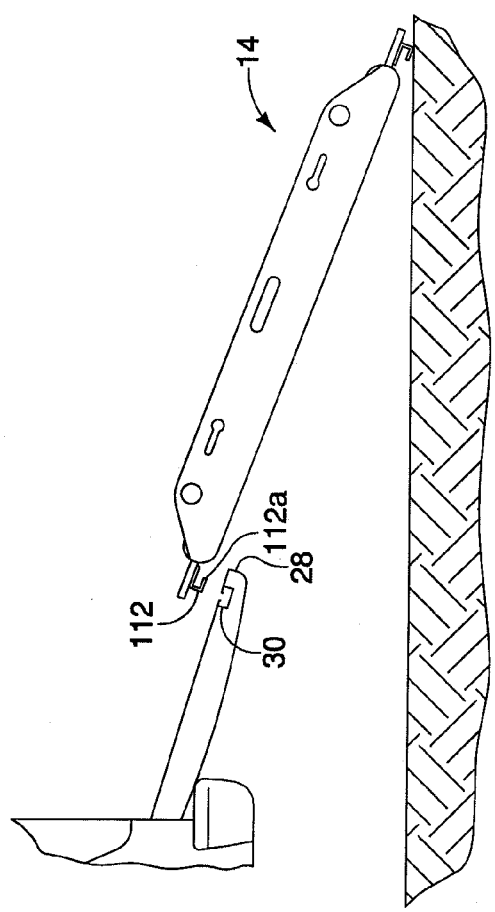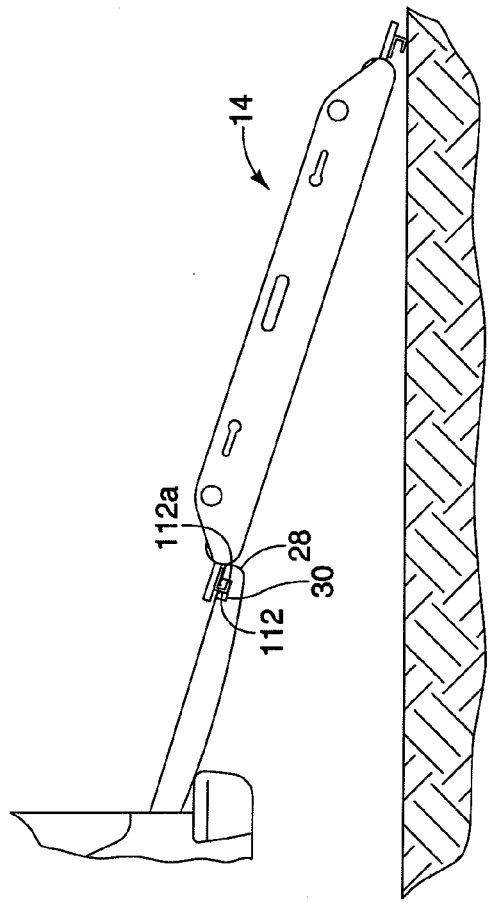

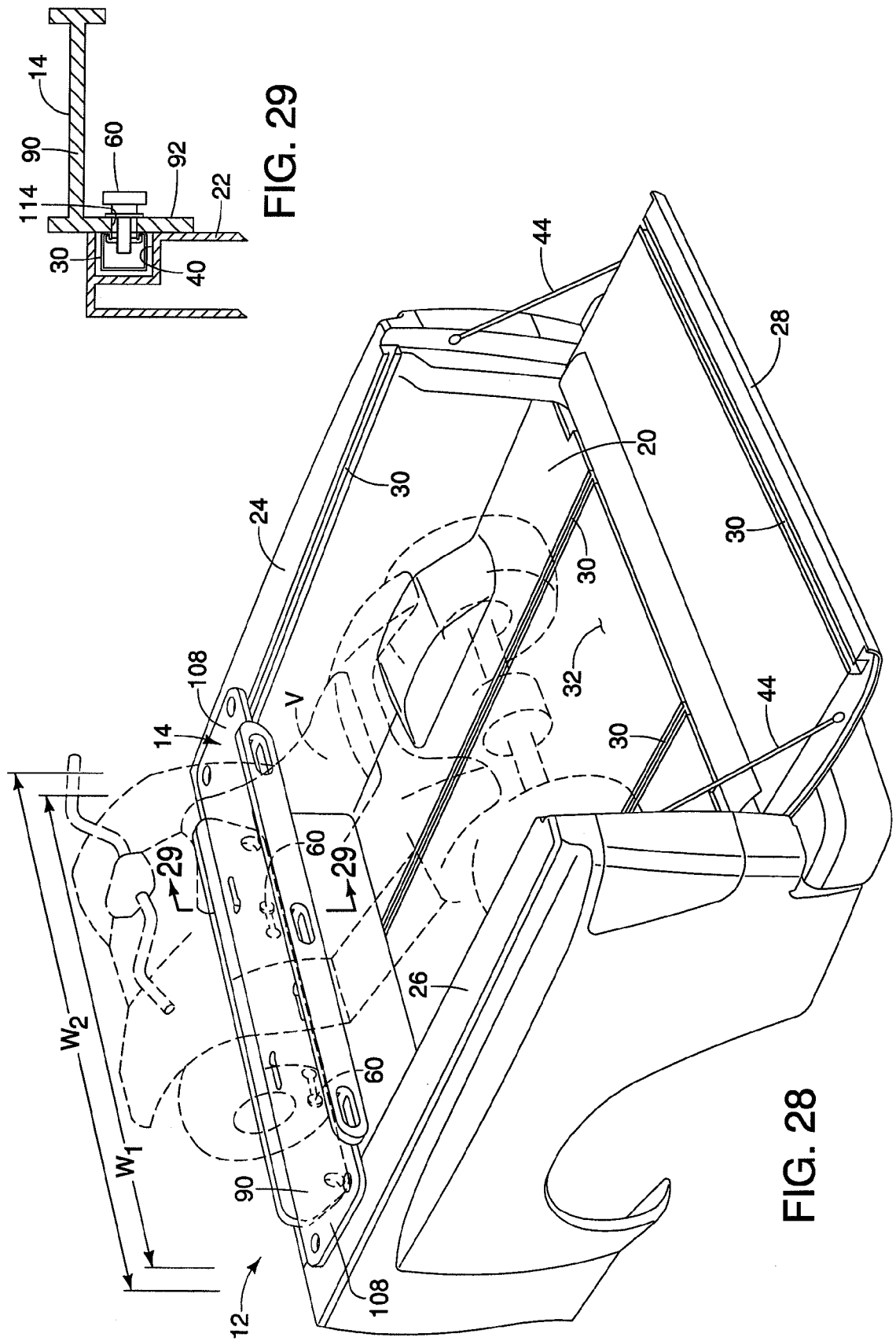

VEHICLE MULTI-PURPOSE CARGO BED ACCESSORY

BACKGROUND OF THE INVENTION

1. Field of the Invention

The present invention relates to a vehicle cargo bed structure and multi-purpose cargo bed accessory, More specifically, the present invention relates to a vehicle cargo bed structure and multi-purpose cargo bed accessory that improves the utility of the cargo bed structure.

2. Background Information

Recently, the cargo bed structure of vehicles, such as a pickup truck, has been improved to include accessory attachment tracks. Such tracks have increased the versatility of the cargo bed of pickup trucks in that cargo can be secured at any of a variety of locations along the accessory attachment tracks. Further, tool boxes can be more easily secured to such accessory attachment tracks without modification or damage to the cargo bed.

Additionally, in another recent development, a pair of parallel tracks is provided on opposite side walls above the cargo bed. A single vertically oriented divider has been developed that can be secured at any point along the parallel tracks dividing the cargo bed into two separate cargo areas. However, the divider has limited usefulness in that it can only be vertically oriented.

In view of the above, it will be apparent to those skilled in the art from this disclosure that there exists a need for improved accessories that can take advantage of the accessory attachment tracks. This invention addresses this need in the art as well as other needs, which will become apparent to those skilled in the art from this disclosure.

SUMMARY OF THE INVENTION

It has been discovered that attachment tracks provided in the cargo area of a vehicle can be used to increase utility and usefulness of the cargo area.

One object of the present invention is to provide a multi-purpose cargo bed accessory that can increase the utility of the cargo area.

Another object of the present invention is to provide a multi-purpose cargo bed accessory that can be attached to tracks in the cargo area in a plurality of differing orientations and locations.

In accordance with one aspect of the invention, a multi-purpose vehicle cargo bed accessory includes a central body portion and a first lateral body portion. The central body portion has a pair of opposed work surfaces defined by a first lateral edge, a second lateral edge and a pair of transverse end edges extending between the first and second lateral edges. The first lateral body portion is rigidly connected along the first lateral edge of the central body portion to form a generally T-shaped transverse cross section with the central body portion along a majority of a length of the first lateral edge. The first lateral body portion has a first longitudinal part extending outwardly from a first side of central body portion and a second longitudinal part extending outwardly from a second side of central body portion. At least one of the central body portion and the first lateral body portion includes a mounting structure configured and arranged to securely fasten the vehicle cargo bed accessory to a vehicle cargo area.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 8 is a top plan view of the cargo bed accessory shown removed from the cargo bed structure in accordance with one embodiment of the present invention;

FIG. 9 is a first side elevational view of the cargo bed accessory shown removed from the cargo bed structure in accordance with one embodiment of the present invention;

FIG. 10 is a second side elevational view of the cargo bed accessory shown removed from the cargo bed structure in accordance with one embodiment of the present invention;

FIG. 11 is a perspective view of the cargo bed accessory shown removed from the cargo bed structure in accordance with one embodiment of the present invention;

FIG. 12 is a cross-sectional view of the cargo bed accessory taken along the line 12-12 in FIG. 8 in accordance with one embodiment of the present invention;

FIG. 13 is another cross-sectional view of the cargo bed accessory similar to FIG. 12 showing an alternate embodiment of the cargo bed accessory in accordance with the present invention;

FIG. 20 is a perspective view of the cargo bed structure showing one of the cargo bed accessories removably attached in a side wall work surface orientation to the track on the side cargo wall in accordance with one embodiment of the present invention;

FIG. 22 is a perspective view of the cargo bed structure showing two of the cargo bed accessories removably attached in a cargo bed partitioning orientation to the tracks on the cargo bed floor in accordance with one embodiment of the present invention;

FIG. 23 is a fragmentary cross-sectional view of the cargo bed floor taken along the line 23-23 in FIG. 22 showing one of the cargo bed accessories removably attached to one of the tracks in the cargo bed partitioning orientation by one of the attachment assemblies in accordance with one embodiment of the present invention;

FIG. 26 is a side elevational view of the cargo bed structure showing one of the cargo bed accessories being removably positioned in the ramp orientation to the track on the tailgate in accordance with one embodiment of the present invention;

FIG. 27 is a side elevational view of the cargo bed structure similar to FIG. 26 showing the cargo bed accessory removably positioned in the ramp orientation to the track on the tailgate in accordance with one embodiment of the present invention;

FIG. 28 is a perspective view of the cargo bed structure showing one of the cargo bed accessories removably attached in a front wall work surface orientation to the track on the front wall in accordance with one embodiment of the present invention;

FIG. 29 is a fragmentary cross-sectional view of the front cargo wall taken along the line 29-29 in FIG. 28 showing one of the cargo bed accessories removably attached to the track on the front cargo wall in the cargo bed partitioning orientation by one of the attachment assemblies in accordance with one embodiment of the present invention.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
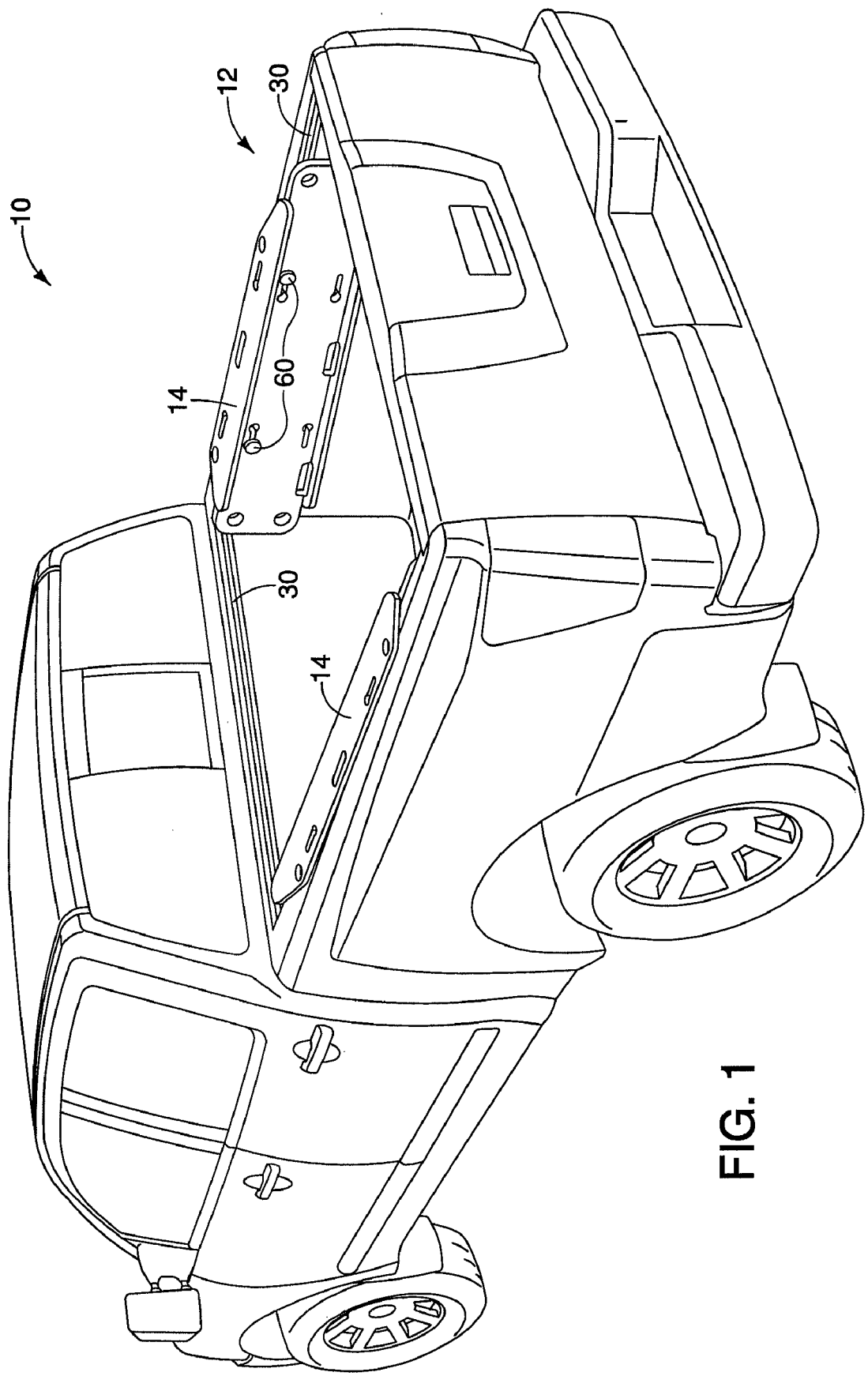
FIG. 1 is a perspective view of a vehicle showing a cargo bed structure that includes a pair of cargo bed accessories, a plurality of accessory attachment tracks, with two of the tracks fixed parallel to one another on a cargo bed floor, one track each fixed on first and second side cargo walls, one track fixed on a front cargo wall and one track fixed on a tailgate, with the cargo bed accessories secured to two of the tracks by attachment assemblies in accordance with one embodiment of the present invention.

Referring initially to FIG. 1, a vehicle 10 with a cargo bed structure 12 and a cargo bed accessory 14 (a multi-purpose vehicle cargo bed accessory) is illustrated in accordance with a first embodiment of the present invention. As described in greater detail below, the cargo bed accessory 14 can be removably attached to the vehicle 10 in a variety of orientations on various surfaces of the cargo bed structure 12, adding versatility and functionality to the vehicle 10.

Figure 2:
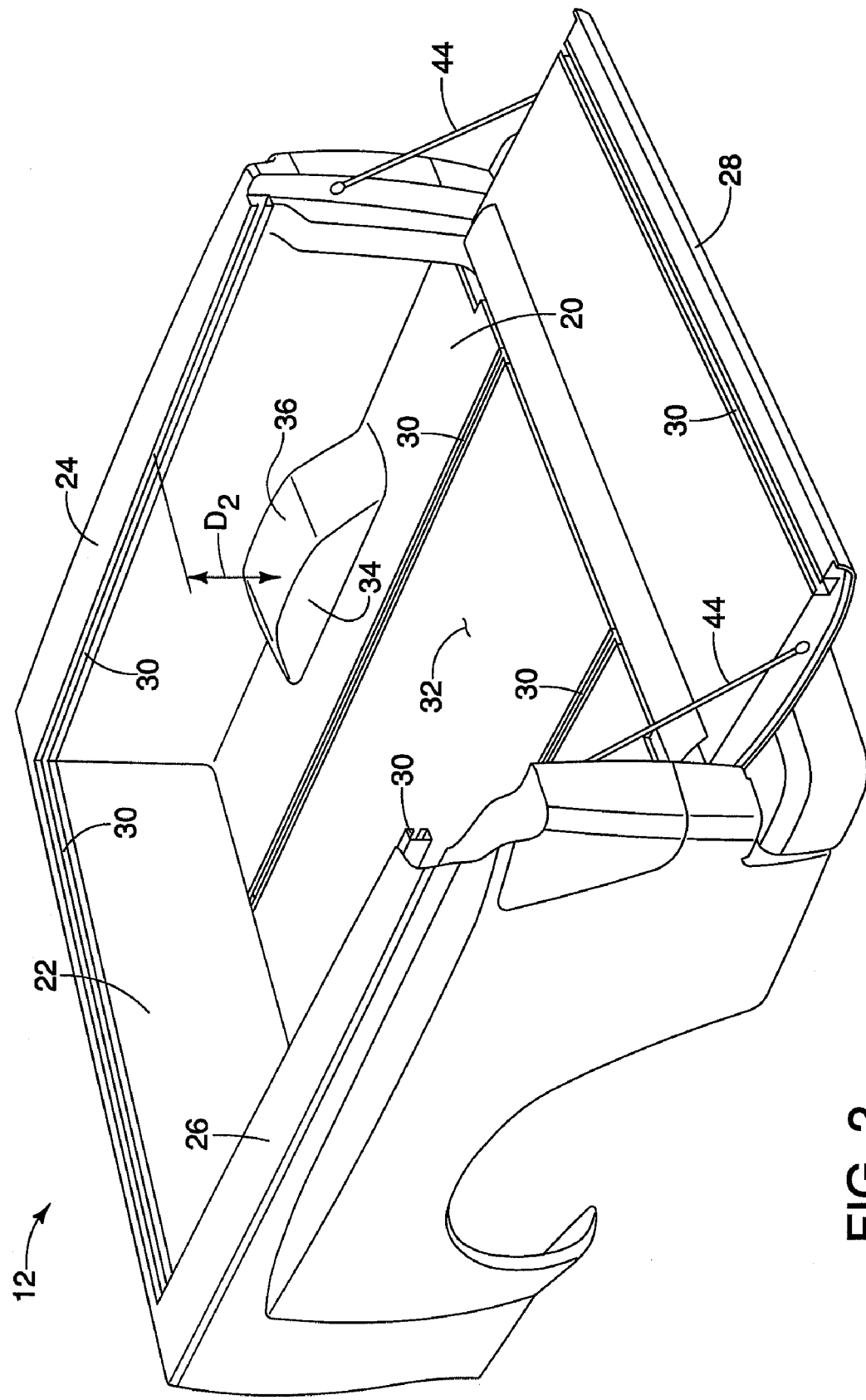
FIG. 2 is a perspective view of the cargo bed structure shown removed from the vehicle with the cargo bed accessories removed showing details of the accessory attachment tracks in accordance with one embodiment of the present invention.
Figure 3:
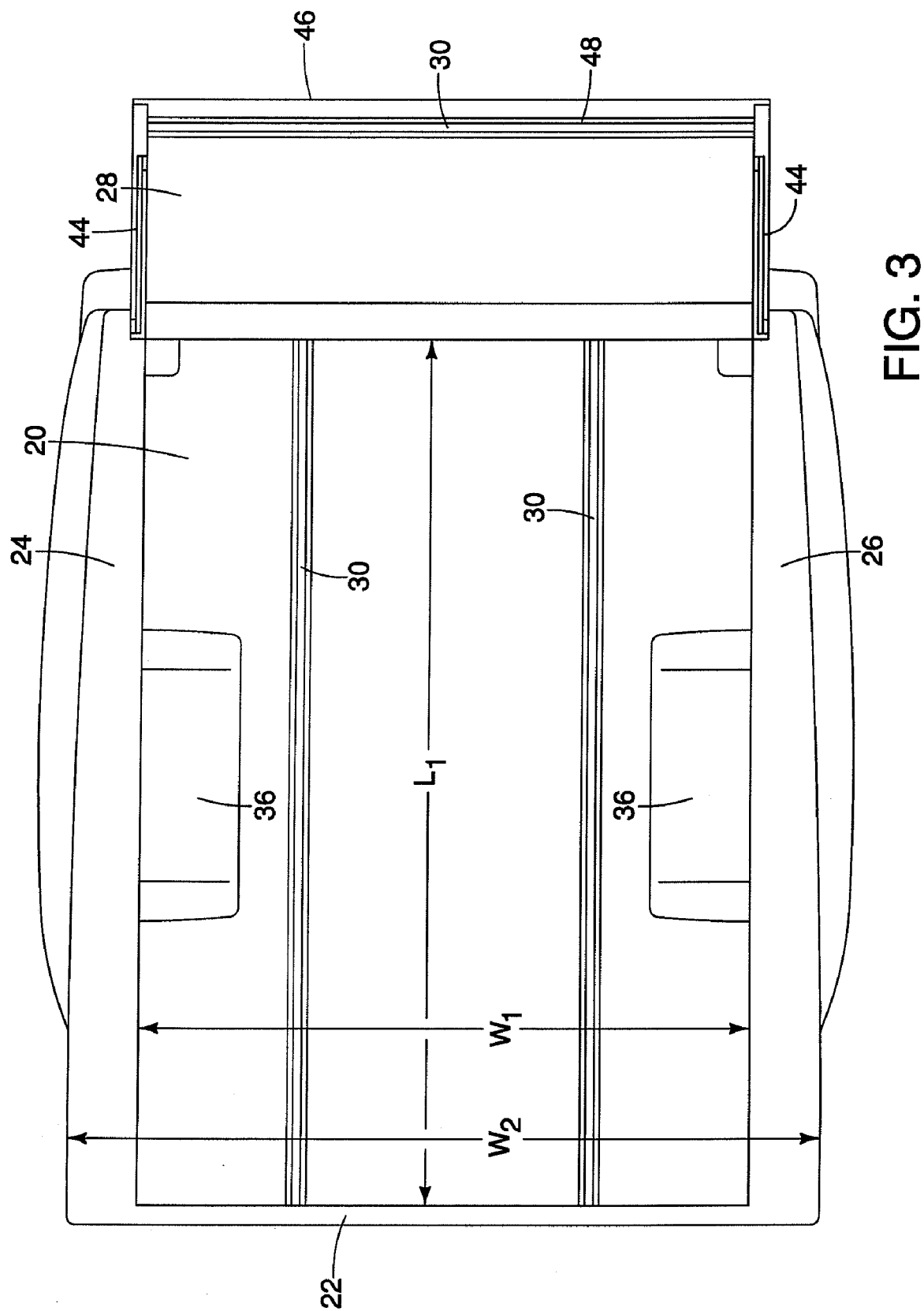
FIG. 3 is a top view of the cargo bed structure with the cargo bed accessories removed showing various details of the cargo bed structure in accordance with one embodiment of the present invention.

With specific reference to FIGS. 2 and 3, a description of the cargo bed structure 12 of the vehicle 10 is now provided. The cargo bed structure 12 is fixedly attached to structural portions (not shown) of the vehicle 10 in a conventional manner. The vehicle 10 is, for example, a conventional pickup truck. However, it should be understood from the description herein and the accompanying drawings that the cargo bed structure 12 and the cargo bed accessory 14 can be use with any of a variety of vehicles, such as vans and other enclosed cargo areas of vehicles.

Since non-cargo bed structures are well known, a description of non-cargo bed structure related portions of the vehicle 10 is omitted for the sake of brevity. The cargo bed structure 12 basically includes a cargo area at least partially defined by a cargo bed floor 20, a front cargo wall 22, a first side cargo wall 24, a second side cargo wall 26, a tailgate 28 and a plurality of accessory attachment tracks 30.

As shown in FIGS. 2 and 3, the cargo bed floor 20 includes a cargo surface 32 that extends in a vehicle lateral direction between the first and second side cargo walls 24 a width $W_1$. The cargo bed floor 20 extends in a vehicle longitudinal direction between the front cargo wall 22 and the tailgate 28 a length $L_1$. The cargo surface 32 is generally rectangular shaped interrupted at either lateral side by wheel wells 34. The wheel wells 34 extend along respective ones of the first and second side cargo walls 24 and 26 in a conventional manner. However, the wheel wells 34 are spaced apart from the front cargo wall 22 and the tailgate 28. Each of the wheel wells 34 has an upper surface 36.

The cargo bed floor 20 also includes a pair of the tracks 30. Specifically, the cargo bed floor 20 is formed with two recesses 38 (one of the recesses 38 shown in FIG. 23) that extend in the vehicle longitudinal direction along the cargo bed floor 20. The tracks 30 are rigidly fixed within respective ones of the recesses 38. The tracks 30 (and recesses 38) are generally parallel to one another and extend from front to rear in the vehicle longitudinal direction. The tracks 30 are fixed within the recesses 38 by conventional means, such as welding or fasteners, such as bolts, rivets or other similar fastening devices. The tracks 30 are described in greater detail below.

The front cargo wall 22 extends between the first and second side cargo walls 24 and 26 and includes one of the tracks 30. The front cargo wall 22 is disposed at a forward end of the bed floor 20. As shown in FIG. 29, the front cargo wall 22 includes a recess 40. The track 30 on the front cargo wall 22 is rigidly fixed within the recess 40 of the front cargo wall 22 just below the upper end of the front cargo wall 22, as shown in FIG. 29. The track 30 is fixed within the recess 40 by conventional means, such as welding or fasteners, such as bolts, rivets or other similar fastening devices.

Figure 15:
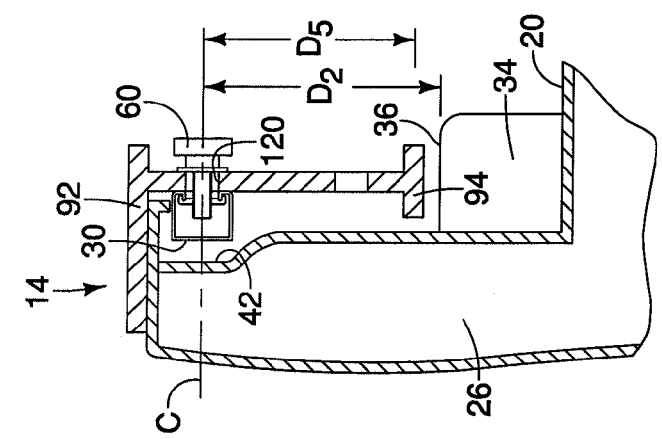
FIG. 15 is a fragmentary cross-sectional view of one of the side cargo walls taken along the line 15-15 in FIG. 14 showing the cargo bed accessory removably attached to the track by one of the attachment assemblies in accordance with one embodiment of the present invention.

The first side cargo wall 24 extends upwardly and approximately perpendicular from the cargo bed floor 20. The first side cargo wall 24 is disposed on a first lateral side of the bed floor 20. The first side cargo wall 24 includes a recess (not shown) with one of the tracks 30 rigidly fixed therein. The recess of the first side cargo wall 24 is similar to a recess 42 of the second side cargo wall 26, as shown in FIG. 15. The track 30 is fixed within the recess by conventional means, such as welding or fasteners, such as bolts, rivets or other similar fastening devices.

The second side cargo wall 26 is disposed on a second lateral side of the bed floor 20. The second side cargo wall 26, like the first side cargo wall 24, also includes a recess 42 with one of the tracks 30 rigidly fixed therein. The track 30 is fixed within the recess 42 by conventional means, such as welding or fasteners, such as bolts, rivets or other similar fastening devices. A distance between inner upper edges of the first and second side cargo walls 24 and 26 is preferably approximately the same as the width $W_1$ of the cargo bed floor 20. A width $W_2$ measured between outer upper edges of the first and second side cargo walls 24 and 26 is greater than the width $W_1$, as shown in FIG. 3.

The tailgate 28 is pivotally attached to the cargo bed structure 12 and extends between lower rear portions of the first and second side cargo walls 24 and 26, as shown in FIG. 2. The tailgate 28 is movable between a closed position shown in FIG. 1 and an open position shown in FIG. 2. The tailgate 28 includes stop supports 44 that are configured to support the tailgate 28 when in the open position (FIG. 2). The stop supports 44 can be removed in order to allow the tailgate 28 to pivot beyond the open position to a ramp position shown in FIGS. 25-27, as described in greater detail below. The tailgate 28 also includes an upper end 46 and a recess 48 formed just below the upper end 46. The recess 48 extends between the lateral sides of the tailgate 28. One of the tracks 30 is rigidly fixed to the tailgate 28 within the recess 48. The track 30 is fixed within the recess 48 by conventional means, such as welding or fasteners, such as bolts, rivets or other similar fastening devices.

Figure 5:
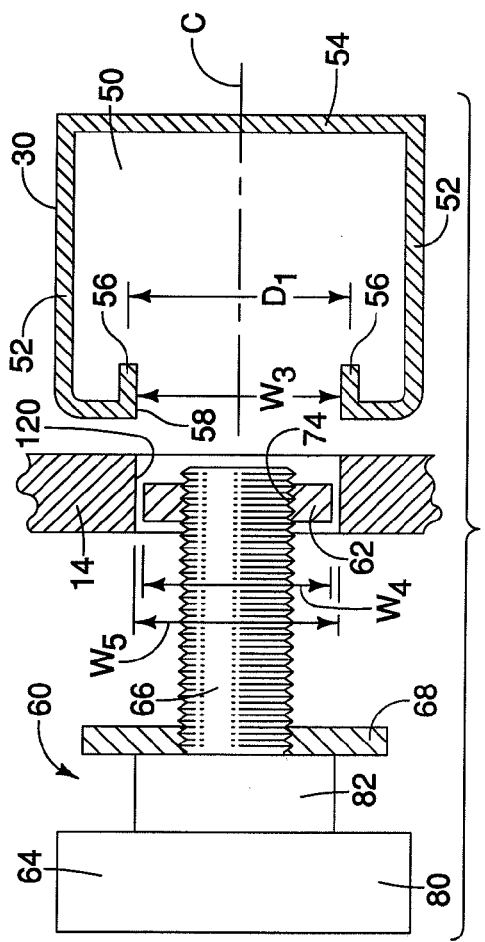
FIG. 5 is an exploded cross-sectional view of one of the attachment assemblies, one of the accessory attachment tracks and one of the cargo bed accessories shown separated from one another in accordance with one embodiment of the present invention.
Figure 7:
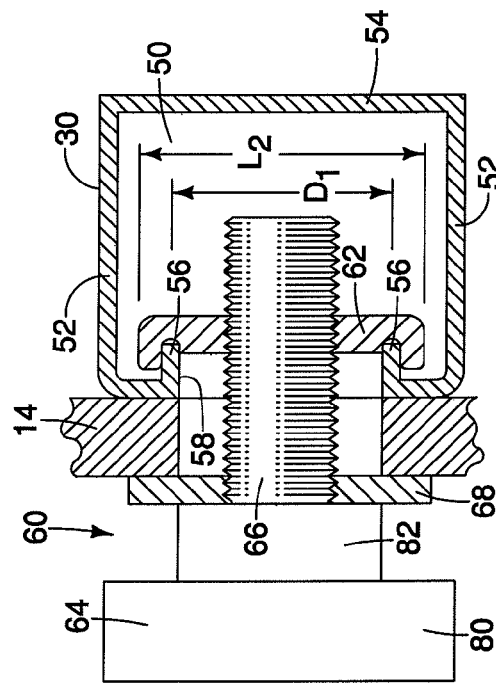
FIG. 7 is still another cross-sectional view of the attachment assembly, the accessory attachment track and the cargo bed accessory depicted in FIGS. 5 and 6 shown completely assembled to one another in accordance with one embodiment of the present invention.
Figure 6:
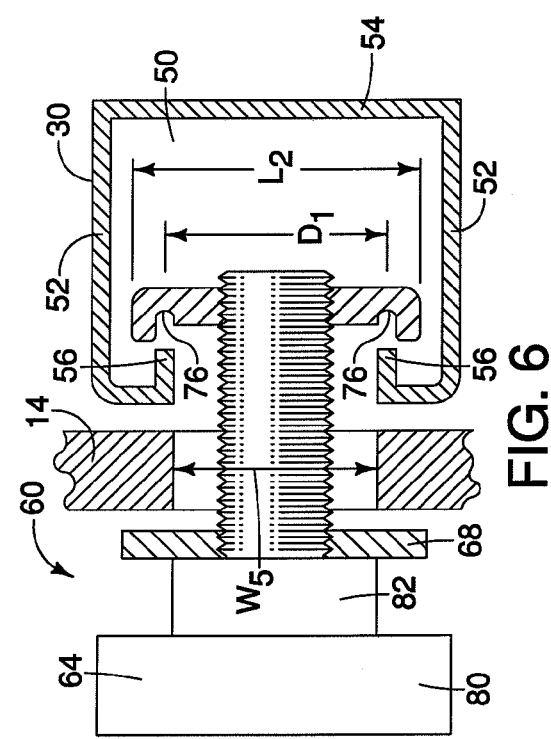
FIG. 6 is another cross-sectional view of the attachment assembly, the accessory attachment track and the cargo bed accessory depicted in FIG. 5 shown partially assembled to one another in accordance with one embodiment of the present invention.

With specific reference to FIGS. 5, 6 and 7, a description of the tracks 30 is now provided. Except for overall length, the tracks 30 are functionally identical to one another and therefore a description of one track 30 applies to all of the tracks 30. It should be understood from the drawings and description herein that the tracks 30 can be cut to differing lengths depending upon the location of installation within the cargo bed structure. However, the overall length of the track 30 does not change its function or usefulness. As stated above, the tracks 30 are rigidly fixed in position. However, the tracks 30 can also alternatively be formed integrally with the corresponding structural portion discussed above (for instance, the cargo bed floor 20, the front cargo wall 22, the first and second side cargo walls 24 and 26 and the tailgate 28).

In the description of the track 30 that follows, no reference is made to the cargo bed floor 20, the front cargo wall 22, the first and second side cargo walls 24 and 26 or the tailgate 28. This omission is intentional because the track 30 functions and usefulness of the track 30 described below are the same regardless of location or orientation of the track 30 within the cargo bed structure 12.

The track 30 is an elongated member that is best understood in cross-section, as shown in FIGS. 5, 6 and 7. The track 30 has a generally U-shaped configuration when viewed in cross-section. The U-shape of the track 30 defines a channel 50 surrounded on three sides by parallel walls 52 and base wall 54. Outer ends of the walls 52 are each formed with projections 56 that extend back into the channel 50. The ends of the projections 56 extend into the channel 50 but are spaced apart from the walls 52 and the base wall 54. Centers of the projections 56 within the channel 50 are spaced apart from one another by a distance $D_1$, as shown in FIG. 5. An elongated opening 58 is defined between the projections 56 and is open to the channel 50. The elongated opening 58 has a width $W_3$ measured between the projections 56, as shown in FIG. 5. Each track 30 further has a centerline C centered between the projections 56 and extending along the length of the track 30 as shown in FIG. 5.

Each of the tracks 30 is positioned strategically on the various portions of the cargo bed structure 12. Specifically, the two tracks 30 in the recesses 38 of the cargo bed floor 20 are positioned such that with one of the cargo bed accessories 14 removably attached to each track 30 (as shown in FIG. 22 and described below), the cargo bed floor 20 is divided into separate storage areas. The track 30 in the recess 40 of the front cargo wall 22 is located just below an upper edge of the front cargo wall 22. The tracks 30 installed on respective ones of the first and second side cargo walls 24 and 26 are also located just below an upper edge of respective ones of the first and second side cargo walls 24 and 26. More specifically, the tracks 30 in each of the first and second side cargo walls 24 and 26 are positioned such that the centerline C of the tracks 30 is located a distance $D_2$ above the upper surface 36 of the wheel wells 34, as shown in FIG. 15. As shown in FIG. 3, the track 30 within the recess 48 of the tailgate 28 is located just below the upper end 46 of the tailgate 28.

Associated with the tracks 30 are attachment assemblies 60, shown in FIGS. 4, 5, 6 and 7. Each attachment assembly 60 includes a clamping member 62, a handle portion 64, a threaded portion 66 fixed to the handle portion 64 and a washer 68.

Figure 4:
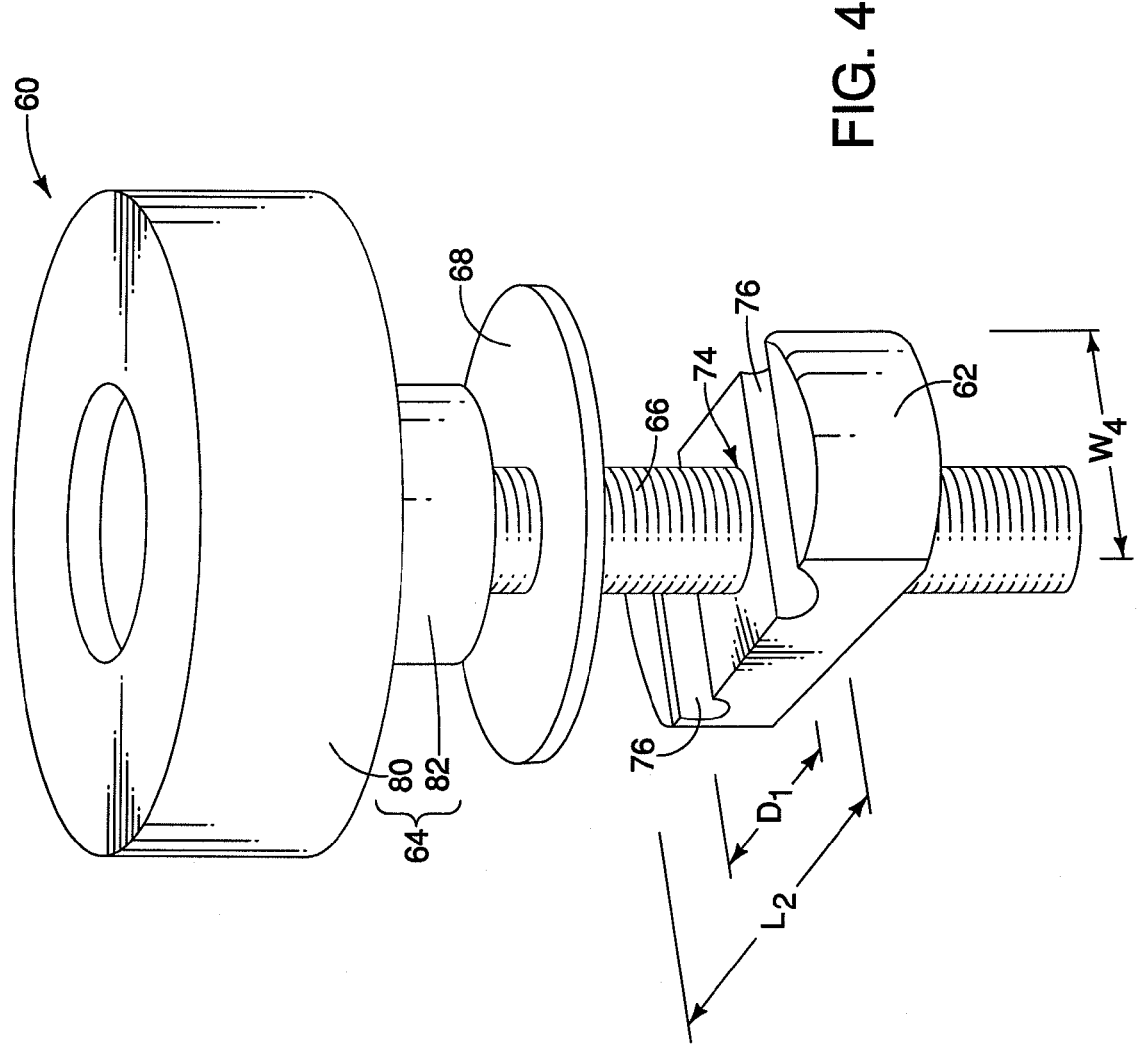
FIG. 4 is a perspective view of an attachment assembly shown removed from the cargo bed structure in accordance with one embodiment of the present invention.

As shown in FIG. 4, the clamping member 62 is a generally flat metallic member. The clamping member 62 basically includes a central threaded aperture 74 and a pair of grooves 76 formed on one surface thereof and on either side of the threaded aperture 74. The grooves 76 are parallel to one another and are spaced apart from one another by the distance $D_1$, corresponding to the distance $D_1$ between the center of the projections 56 of the tracks 30 shown in FIG. 5. The clamping member 62 is dimensioned with a width $W_4$ (shown in FIGS. 4 and 5) and a length $L_2$ (shown in FIGS. 4 and 7).

As indicated by comparing FIGS. 5 and 7, the length $L_2$ of the clamping member 62 is greater than the dimensions of the width $W_4$ and the distance $D_1$. The width $W_4$ of the clamping member 62 is slightly less than the width $W_3$ of the elongated opening 58 in the tracks 30, as shown in FIG. 5. However, the length $L_2$ is greater than the width $W_3$ of the elongated opening 58 in the tracks 30 but less than the internal overall width of the channel 50. Consequently, the clamping member 62 can fit through the elongated opening 58 of the tracks 30 as long as the clamping member 62 is oriented in a longitudinal direction relative to the tracks 30, as indicated in FIG. 5. However, when turned 90 degrees as shown in FIGS. 6 and 7, the grooves 76 of the clamping member 62 align with the projections 56 of the tracks 30.

The handle portion 64 basically includes a round knob end 80 and a recessed section 82. The round knob end 80 can have any of a variety of shapes and profiles, but is shown as a round member as an example shape only. The threaded portion 66 is rigidly fixed to or formed with the recessed section 82 of the handle portion 64 such that as the handle portion 64 is rotated, the threaded portion 66 rotates therewith. The threaded portion 66 is machined or otherwise manufactured to fit into the threaded aperture 74 of the clamping member 62. Optionally, the washer 68 can be included on the threaded portion 66. A description of use and operation of the attachment assemblies 60 is provided below after a description of the cargo bed accessories 14.

A description of the cargo bed accessory 14 is now provided with specific reference to FIGS. 8-13. The present invention preferably includes at least two of the cargo bed accessories 14. However, it should be understood from the drawings and description herein that the present invention can include one of the cargo bed accessories 14, two, three or more. For the sake of brevity, description of one of the cargo bed accessories 14 is provided but applies to all of the cargo bed accessories 14.

As shown in FIGS. 8 and 11, the cargo bed accessory 14 (multi-purpose vehicle cargo bed accessory) is an elongated board-like device. The cargo bed accessory 14 basically includes a central body portion 90, a first lateral body portion 92 and a second lateral body portion 94. The central body portion 90, the first lateral body portion 92 and the second lateral body portion 94 are made with a non-corrosive material, such as a high strength plastic material or high strength polymer material, composite materials or aluminum. As shown in FIG. 12, the central body portion 90, the first lateral body portion 92 and the second lateral body portion 94 can be separate members fixedly attached to one another by adhesives, welding or fasteners. Alternatively as shown in FIG. 13, a cargo bed accessory 14' includes the central body portion 90, the first lateral body portion 92 and the second lateral body portion 94 that can be formed as a homogeneous single unitary member.

The cargo bed accessory 14 is configured such that at least one of the central body portion 90 and the first lateral body portion 92 is configured and arranged to attach, detach and reattach to any one of the accessory mounting tracks 30, as described in greater detail below.

As best shown in FIGS. 8-13, the central body portion 90 basically includes a pair of opposed work surfaces 100 and 101, a first lateral edge 102, a second lateral edge 104, a plurality of elongated handle apertures 106, a pair of transverse end edges 108 extending between the first and second lateral edges 102 and 104, a plurality of cargo tie-down apertures 110, a pair of hook members 112 and mounting structures 114. Each of the transverse end edges 108 of the central body portion 90 extends away from corresponding ends of the first lateral body portion 92 in a lengthwise direction of the central body portion 90.

Each of the cargo tie-down apertures 110 extends through the central body portion 90. With the cargo bed accessory 14 secured to one of the tracks 30 (described below), the cargo tie-down apertures 110 provide convenient locations to secure cargo in place within the cargo bed structure 12.

The pair of hook members 112 are elongated steel or otherwise rigid reinforced members that are rigidly fixed to the surface 101 of the central body portion 90. The hook members 112 are attached to the surface 101 at respective locations adjacent to but spaced apart from opposing ones of the transverse end edges 108 of the central body portion 90. Each hook member 112 includes a projection 112a (a hook end portion) configured to fit into the elongated opening 58 of the tracks 30, as described in greater detail below with reference to FIGS. 25-27. Specifically, each of the projections 112a has a width that is slightly smaller than the width $W_4$ of the elongated opening 58 of the tracks 30 such that the projections 112a can be positioned in the elongated opening 58, as shown in FIG. 27. The projection 112a extends generally perpendicular to the length of the central body portion 90.

As shown in FIG. 28, an overall length of the central body portion 90 is greater than an overall distance or width $W_1$ between the first and second side cargo walls 24 and 26 such that the central body portion 90 spans the overall distance between first and second side cargo walls 24 and 26 when laid between the first and second side cargo walls. Further, as indicated in FIG. 28, the overall length of the central body portion 90 is approximately the same or less than the distance or width $W_2$ between the outer upper edges of the first and second side cargo walls 24 and 26. As indicated in FIG. 22, the overall length of the central body portion 90 is approximately the same or less than the overall length $L_1$ of the cargo bed floor 20.

As shown best in FIGS. 8 and 11, there are four of the mounting structures 114 in the central body portion 90. As shown in FIG. 8, each mounting structure 114 is a keyhole shaped aperture that extends between the surfaces 100 and 101 adjacent to at least one of the first and second lateral edges 102 and 104 of the central body portion 90. Each mounting structure 114 is configured and arranged to securely but removably attach the cargo bed accessory 14 to the tracks 30 in the vehicle cargo area of the cargo bed structure 12.

All of the mounting structures 114 are dimensionally the same. Therefore, description of one applies to all regardless of its location. The keyhole shaped aperture of the mounting structure 114 includes a slot portion 120 and a rounded portion 122. The diameter of the rounded portion 122 is larger than a width $W_5$ of the slot portion 120, as is indicated in FIG. 8. As shown in FIGS. 8 and 11, the slot portion 120 of the keyhole shaped aperture extends in a longitudinal direction relative to the central body portion 90.

As indicated in FIG. 5, the width $W_5$ of the slot portion 120 is slightly larger than the width $W_4$ of the clamping member 62 of the attachment assembly 60. Consequently, the clamping member 62 can fit lengthwise through the slot portion 120 of the mounting structure 114, as indicated in FIG. 5. Further, the width $W_5$ of the slot portion 120 is about the same or slightly smaller than the width $W_3$ of the elongated opening 58 of the track 30. Consequently, the clamping member 62 can fit lengthwise through the elongated opening 58 of the track 30, as also indicated in FIG. 5.

With specific reference to FIGS. 8-13, a description of the first lateral body portion 92 of the cargo bed accessory 14 is now provided. The first lateral body portion 92 is rigidly connected to (or rigidly formed with) the central body portion 90 along the first lateral edge 102 of the central body portion 90. The first lateral body portion 92 forms a generally T-shaped or L-shaped transverse cross section with the central body portion 90 along a majority of a length of the first lateral edge 102, as indicated in FIGS. 12 and 13. As shown in FIGS. 8 and 9, an overall length of the first lateral body portion 92 is less than the overall length of the central body portion 90. Further, as indicated in FIG. 28, the overall length of the first lateral body portion 92 is less than the overall distance between the first and second side cargo walls 24 and 26.

The first lateral body portion 92 includes a first longitudinal part 130 and a second longitudinal part 132. As shown in FIGS. 12 and 13, a distance measured between an edge of the first longitudinal part 130 to an edge of the second longitudinal part 132 defines a width $W_6$. As also shown in FIGS. 12 and 13, the first longitudinal part 130 of the first lateral body portion 92 extends outwardly from the surface 100 (a first side) of the central body portion 90 a distance $D_3$ and the second longitudinal part 132 of the first lateral body portion 92 extends outwardly from the surface 101 (a second side) of the central body portion 90 a distance $D_4$. The distance $D_4$ is less than the distance $D_3$.

As shown in FIGS. 9, 10 and 11, opposite ends of the first longitudinal part 130 of the first lateral body portion 92 have inclined longitudinal end portions 134. The first longitudinal part 130 of the first lateral body portion 92 also includes a pair of cargo tie-down apertures 110a, a pair of the mounting structures 114 and a central elongated handle aperture 106. The cargo tie-down apertures 110a are generally the same as the cargo tie-down apertures 110, except that the cargo tie-down apertures 110a extend through the first lateral body portion 92. The mounting structures 114 include the above described keyhole shaped aperture, therefore duplicate description of these features is omitted for the sake of brevity. However, it should be noted that the slot portion 120 of the keyhole shaped aperture of the mounting structures 114 extends in a longitudinal direction relative to the first lateral body portion 90.

The second lateral body portion 94 is rigidly connected along the second lateral edge 104 of the central body portion 90, as shown in FIGS. 8 and 11-13. The second lateral body portion 94 forms a generally T-shaped transverse cross section with the central body portion 90 along a majority of a length of the second lateral edge 104. A first longitudinal part of the second lateral body portion 94 extends outwardly from the surface 100 (the first side) of the central body portion 90 by the distance $D_4$. Similarly, a second longitudinal part of the second lateral body portion 94 extends outwardly from the surface 101 (the second side) of the central body portion 90 by the distance $D_4$. An overall width measured from an edge of the first longitudinal part to an edge of the second longitudinal part of the second lateral body portion 94 defines a distance or width $W_7$ that is smaller than the width $W_6$ of the first lateral body portion 92.

As shown best in FIGS. 10 and 11, the second lateral body portion 94 includes three elongated handle apertures 106 that open to the elongated handle apertures 106 of the central body portion 90.

Figure 14:
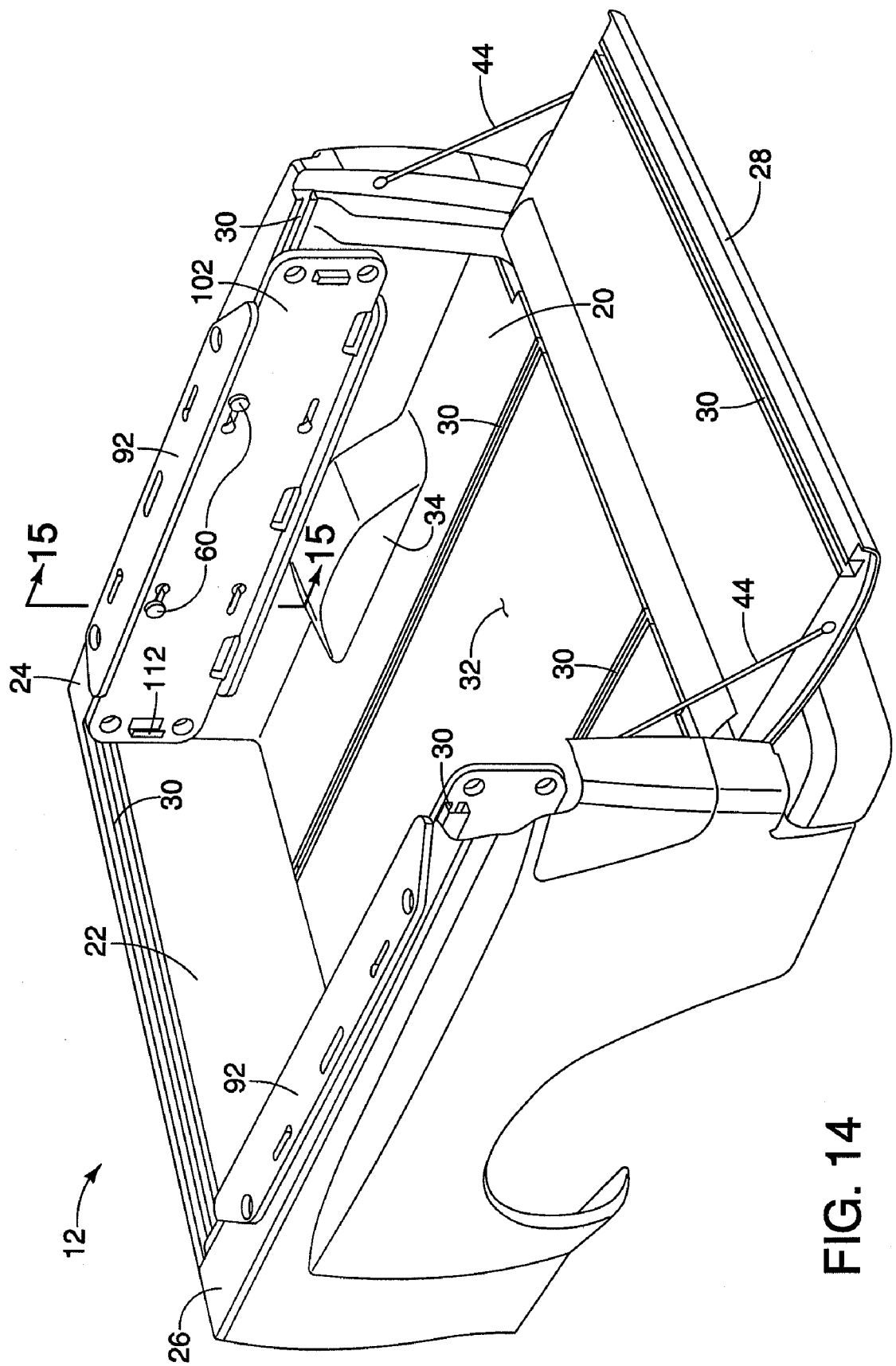
FIG. 14 is a perspective view of the cargo bed structure showing two of the cargo bed accessories removably attached in stowed positions to the tracks on the side cargo walls in accordance with one embodiment of the present invention.

The cargo bed accessory 14 is dimensioned with specific relationships to the tracks 30 and the features of the cargo bed structure 12. Specifically, as mentioned above, the cargo bed accessory 14 is slightly shorter than the length $L_1$ of the cargo bed floor 20 and longer than the distance (width $W_1$) between the first and second cargo walls 24 and 26. Another dimensional relationship exists with reference to the wheel wells 34. Specifically, as shown in FIGS. 14 and 15, the cargo bed accessories 14 can be secured to the tracks 30 in the first and second side walls 24 and 26 with the attachment assemblies 60. As shown in FIG. 8, a distance $D_5$ is defined between a center of the slot portion 120 of the mounting structures 114 adjacent to the first lateral edge 102 of the central body portion 90 and the second lateral body portion 94. As shown in FIG. 15, the distance $D_5$ is slightly less than the distance $D_2$ between the centerline C of the track 30 and the upper surface 36 of the wheel wells 34.

The specific dimensions of the cargo bed accessories 14 allow each cargo bed accessory 14 to be installed in any of a variety of locations and orientations relative to the various tracks 30 of the cargo bed structure 12. Attachment to one of the tracks 30 is simple. First the cargo bed accessory 14 is positioned in the desired location and orientation with one or more of the mounting structures 114 approximately aligned or close to one of the tracks 30. Next, as indicated in FIGS. 5-7, one of the attachment assemblies 60 is installed.

Since the slot portion 120 of the mounting structure 114 and the elongated opening 58 of the track 30 are dimensionally the same or similar, the clamping member 62 of the attachment assembly 60 can be inserted through the slot portion 120 and the elongated opening 58, as indicated in FIG. 5. However it should be understood from the drawings and description herein, that the clamping member 62 can be inserted through either the rounded portion 122 or the slot 120 of the mounting structure 114 and then into the elongated opening 58.

Once the clamping member 62 is inserted through the elongated opening 58 and into the channel 50 of the track 30, the clamping member 62 can be rotated 90 degrees as shown in FIGS. 6 and 7. With the clamping member 62 oriented as shown in FIGS. 6 and 7, the grooves 76 align with the projections 56 in the parallel walls 52 of the track 30. Thereafter, the handle portion 64 of the attachment assembly 60 is rotated to tighten the attachment assembly 60 and the cargo bed accessory 14 to the track 30. The cargo bed accessory 14 is thereby removably fixed to the track 30 (and the portion of the cargo bed structure 12 associated with the track 30).

A second attachment assembly 60 is installed in a similar manner. To remove the cargo bed accessory 14, the process is reversed. Specifically, the attachment assembly 60 is loosened and then removed from the track 30. Thus, the cargo bed accessory 14 can be attached, removed and reattached in a simple manner.

FIGS. 14 and 15 show two of the cargo bed accessories 14 secured in the cargo bed structure 12 in a stowed orientation. Specifically, one of the cargo bed accessories 14 is secured to the track 30 of the first side cargo wall 24 with two of the attachment assemblies 60 and another one of the cargo bed accessories 14 is secured to the track 30 of the second side cargo wall 26 with two more of the attachment assemblies 60. In the depicted stowed orientation, the second lateral body portion 94 extends generally horizontally above and adjacent to the upper surface 36 of the wheel well 34, as shown in FIG. 15. Since the distance $D_5$ between a center of the slot portion 120 and the edge of the second lateral body portion 94 is less than the distance $D_2$, the wheel well 34 does not interfere with position of the cargo bed structure 12. Further, in the stowed position, the first lateral body portion 92 extends along an upper surface of the second side cargo wall 26.

Figure 17:
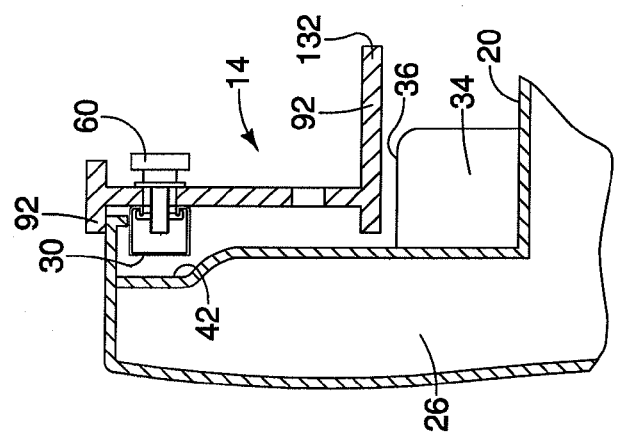
FIG. 17 is a fragmentary cross-sectional view of one of the side cargo walls taken along the line 17-17 in FIG. 16 showing the cargo bed accessory removably attached to the track in the cargo bed shelf forming orientation by one of the attachment assemblies in accordance with one embodiment of the present invention.
Figure 16:
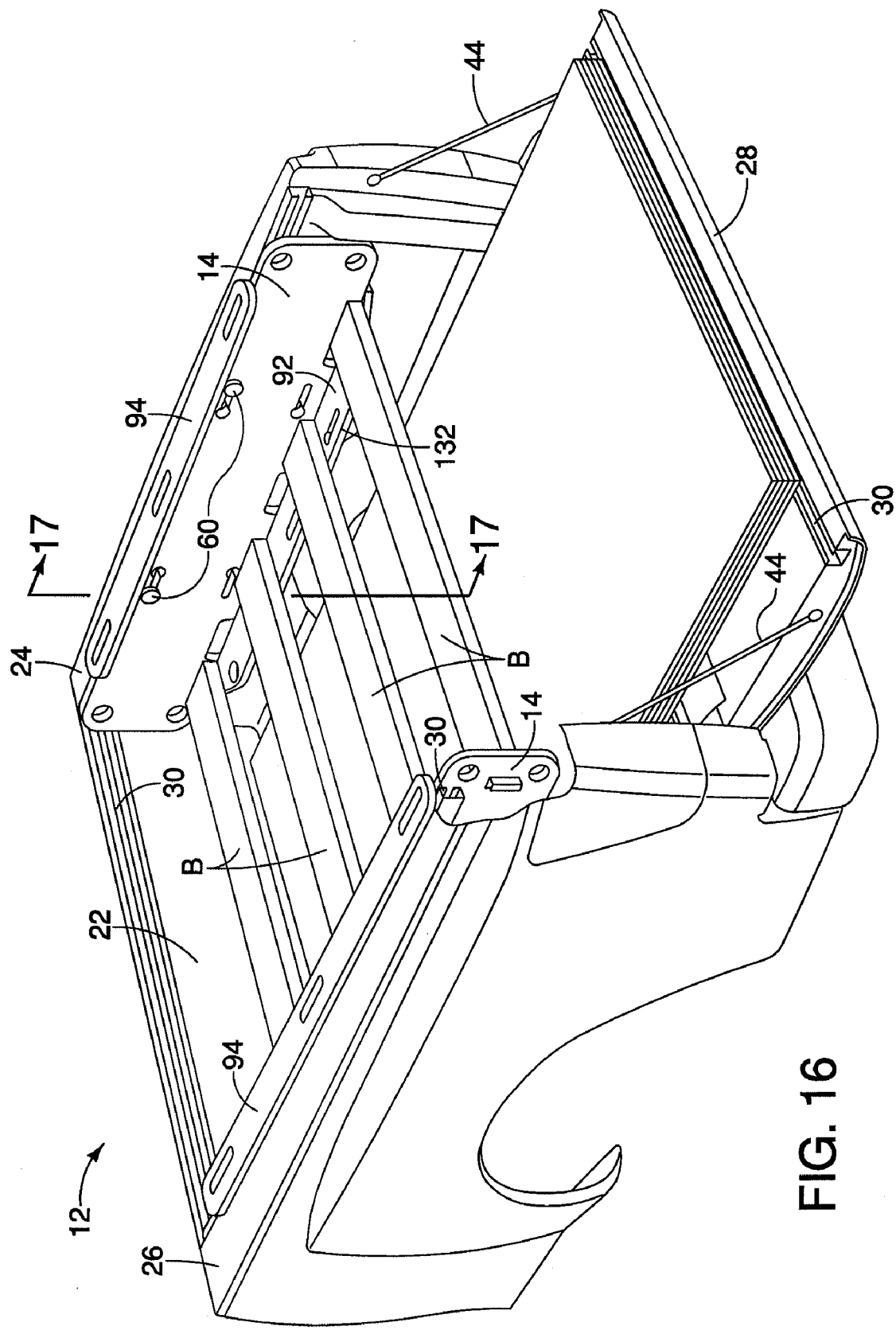
FIG. 16 is a perspective view of the cargo bed structure showing two of the cargo bed accessories removably attached in a cargo bed shelf forming orientation to the tracks on the side cargo walls in accordance with one embodiment of the present invention.

FIGS. 16 and 17 show two of the cargo bed accessories 14 secured in the cargo bed structure 12 in a shelf forming orientation. Specifically, one of the cargo bed accessories 14 is secured to the track 30 of the first side cargo wall 24 with two of the attachment assemblies 60 and another one of the cargo bed accessories 14 is secured to the track 30 of the second side cargo wall 26 with two more of the attachment assemblies 60. In the depicted shelf forming orientation, the first lateral body portion 92 extends generally horizontally above and adjacent to the upper surface 36 of the wheel well 34, as shown in FIGS. 16 and 17. The first longitudinal part 132 of the first lateral body portion 92 of each of the two cargo bed accessories 14 protrude into the cargo area of the cargo bed structure 12. Consequently, a shelf is created upon which cargo can be positioned. In the example depicted in FIGS. 16 and 17, boards B are placed on the first lateral body portion 92 to create a cargo supporting surface above the cargo bed floor 20. Consequently, differing cargo materials can be vertically separated from one another.

Figure 19:
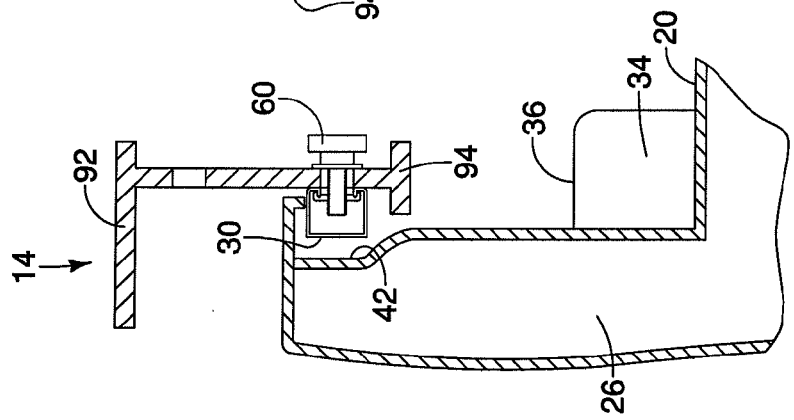
FIG. 19 is a fragmentary cross-sectional view of one of the side cargo walls taken along the line 19-19 in FIG. 18 showing the cargo bed accessory removably attached to the track in the side wall height increasing orientation by one of the attachment assemblies in accordance with one embodiment of the present invention.
Figure 18:
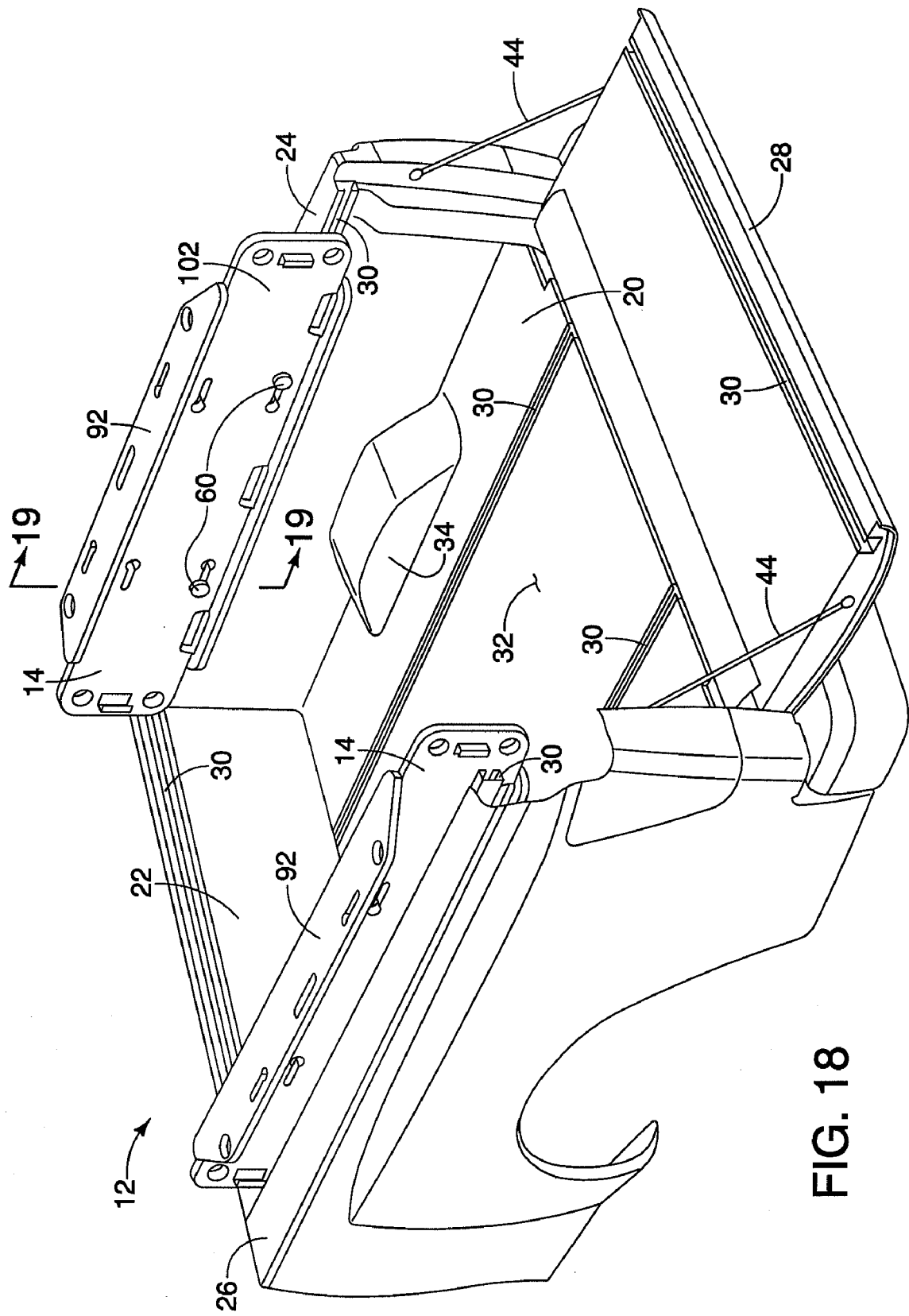
FIG. 18 is a perspective view of the cargo bed structure showing two of the cargo bed accessories removably attached in a side wall height increasing orientation to the tracks on the side cargo walls in accordance with one embodiment of the present invention.

FIGS. 18 and 19 show two of the cargo bed accessories 14 secured in the cargo bed structure 12 in a side wall height increasing orientation. Specifically, one of the cargo bed accessories 14 is secured to the track 30 of the first side cargo wall 24 with two of the attachment assemblies 60 and another one of the cargo bed accessories 14 is secured to the track 30 of the second side cargo wall 26 with two more of the attachment assemblies 60. In the depicted side wall height increasing orientation, the first lateral body portions 92 of the cargo bed accessories 14 are positioned above and spaced apart from the upper edges of the first and second side cargo walls 24 and 26. The first lateral body portions 92 are approximately horizontally oriented above the first and second side cargo walls 24 and 26 and the central body portion 90 extends approximately vertically upward from the first and second side cargo walls 24 and 26. Consequently, effective cargo retaining height of the first and second side cargo walls 24 and 26 is increased accordingly.

Figure 21:
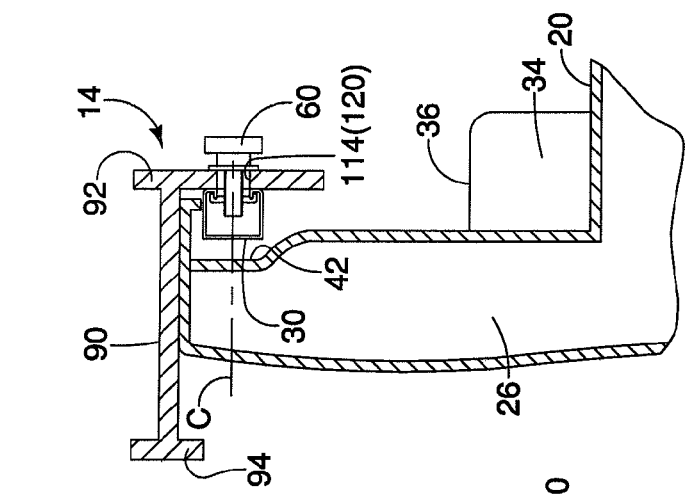
FIG. 21 is a fragmentary cross-sectional view of one of the side cargo walls taken along the line 21-21 in FIG. 20 showing the cargo bed accessory removably attached to the track in the side wall work surface orientation by one of the attachment assemblies in accordance with one embodiment of the present invention.

FIGS. 20 and 21 show two of the cargo bed accessories 14 secured in the cargo bed structure 12, one in the stowed position (described above) and one in a side wall work surface orientation. Specifically, the cargo bed accessories 14 secured to the track 30 of the second side cargo wall 26 with two of the attachment assemblies 60 is in the side wall work surface orientation. As shown in FIG. 21, the mounting structures 114 of the first lateral body portion 92 of the cargo bed accessory 14 are used to secure the cargo bed accessory 14 to the second side cargo wall 26. Consequently, the central body portion 90 of the cargo bed accessory 14 is approximately horizontally oriented, providing a work surface. The work surface provided by the central body portion 90 can be used for tools or for additional space to accommodate camping or tailgate parties. It should be understood from the drawings and description herein that although only one of the cargo bed accessories 14 is shown in the side wall work surface orientation in FIGS. 20 and 21, both cargo bed accessories 14 can be oriented in the side wall work surface orientation, if required or desired. Further, the cargo bed accessories 14 can be installed in the side wall work surface orientation extending towards or away from the cargo area.

FIGS. 22 and 23 show two of the cargo bed accessories 14 secured in the cargo bed structure 12 in a cargo bed partitioning orientation. Specifically, the cargo bed accessories 14 are secured to the tracks 30 of the cargo bed floor 20. In the depicted cargo bed partitioning orientation, the mounting structures 114 of the first lateral body portions 92 of the cargo bed accessories 14 are used with two of the attachment assemblies 60 to secure the cargo bed accessories 14 in position. In the depicted cargo bed partitioning orientation, the first lateral body portions 92 are approximately horizontally oriented and the central body portions 90 are approximately vertically oriented thus defining partitions to divide the cargo area of the cargo bed structure 12 into separate spaces. It should be understood that one or both of the cargo bed accessories 14 can be installed to create two or three divided cargo spaces or sections.

Figure 24:
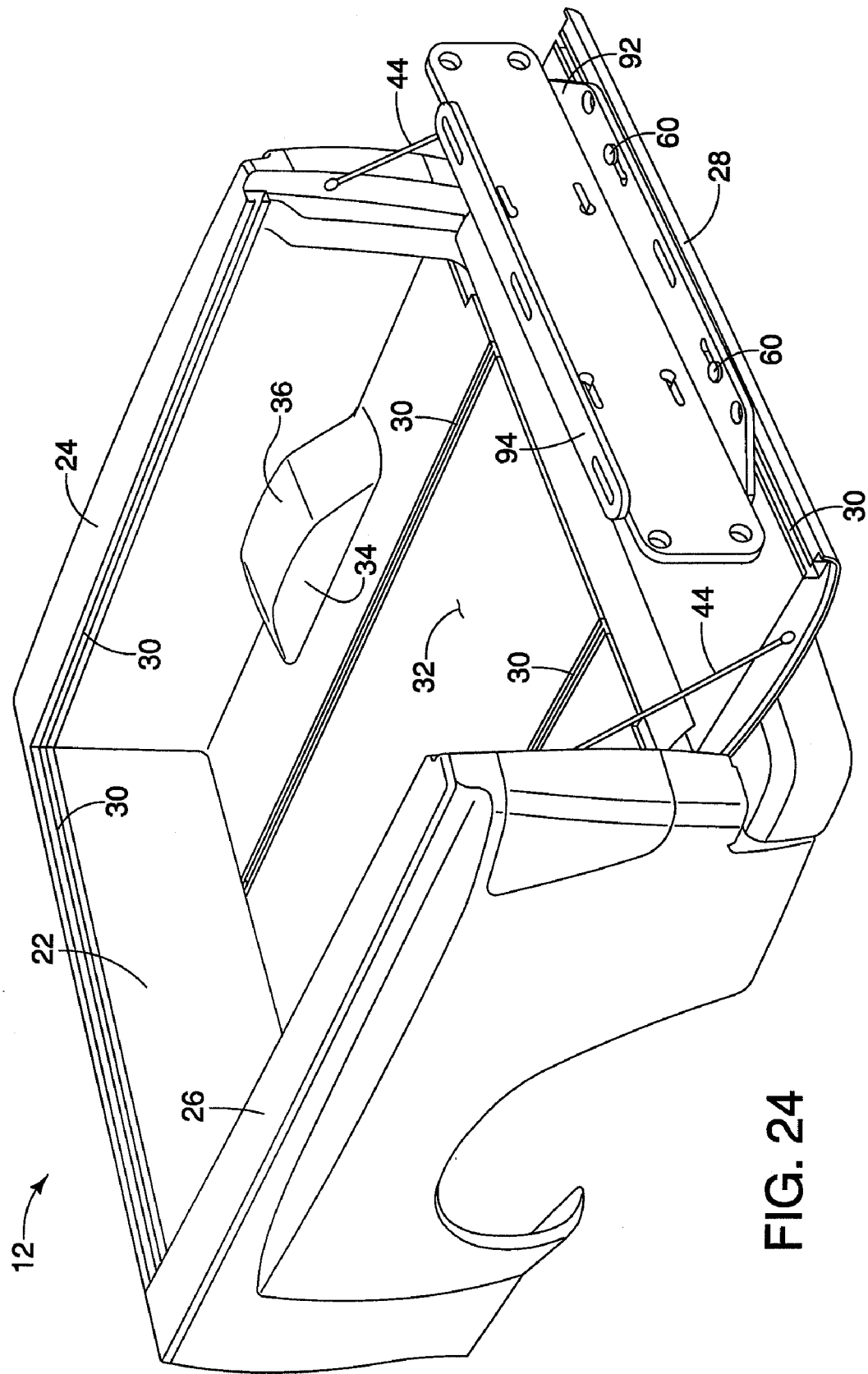
FIG. 24 is a perspective view of the cargo bed structure showing one of the cargo bed accessories removably attached in a cargo bed extending orientation to the track on the tailgate in accordance with one embodiment of the present invention.

As shown in FIG. 24, one of the cargo bed accessories 14 can also be secured to the track 30 of the tailgate 28 in a cargo bed extending orientation. Specifically, the mounting structures 114 of the first lateral body portion 92 of the cargo bed accessory 14 is used with two of the attachment assemblies 60 to secure the cargo bed accessories 14 to the track 30 in the tailgate 28. The first lateral body portion 92 is oriented in an approximately horizontal orientation along the surface of the open tailgate 28 and the central body portion 90 extends approximately vertically upward. Since the track 30 of the tailgate 28 is at a rearmost location with the tailgate 28 lowered in the open position, the effective length of the cargo bed floor 20 is extended. Cargo placed on the cargo bed floor 20 is prevented from sliding backward by the cargo bed accessory 14 secured to the tailgate 28.

Figure 25:
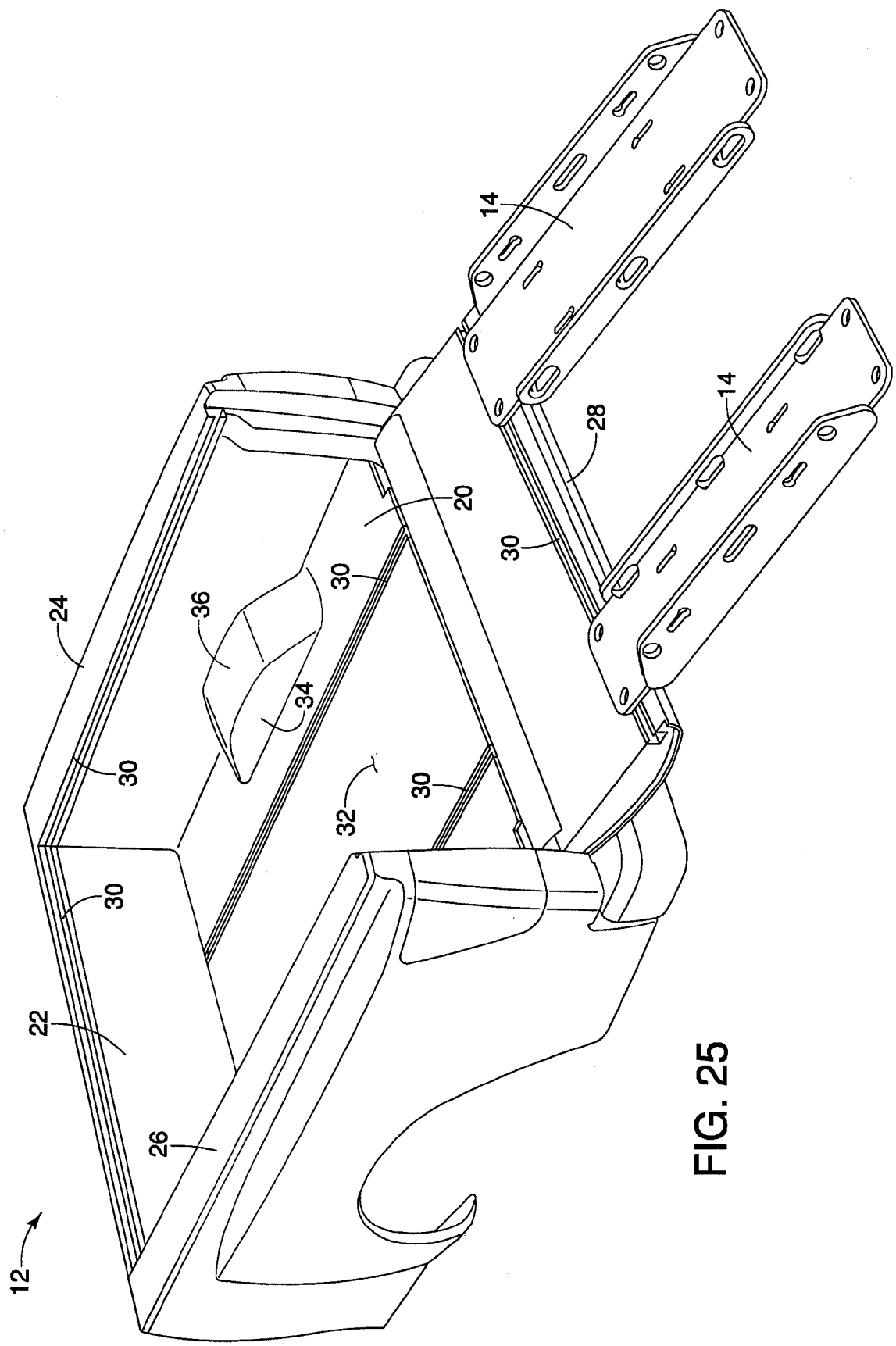
FIG. 25 is a perspective view of the cargo bed structure showing two of the cargo bed accessories removably positioned in a ramp orientation to the track on the tailgate in accordance with one embodiment of the present invention.

As shown in FIGS. 25-27, the stop supports 44 of the tailgate 28 can be removed, allowing the tailgate 28 to angle slightly downward. The cargo bed accessories 14 can then be installed in a ramp orientation. Specifically, the projections 112a of the hook members 112 at one end of each of the cargo bed accessories 14 can be inserted into the track 30 of the tailgate 28. As indicated in FIG. 26, one end of each of the cargo bed accessories 14 is raised above the tailgate 28. The projections 112a of the hook members 112 are then lowered into the tracks 30, as indicated in FIG. 27. Equipment such as a lawn mower, small tractor or an off-road vehicle V (see FIG. 28) can be brought up the cargo bed accessories 14 and onto the cargo bed floor 20. The cargo bed accessories 14 can be removed from the tracks 30 of the tailgate 28 by lifting the projections 112a out of the track 30.

As shown in FIGS. 28 and 29, one of the cargo bed accessories 14 is secured to the track in the front cargo wall 22 in another work surface providing orientation. Specifically, the cargo bed accessory 14 is removably attached to the track 30 in the front cargo wall 22 such that the transverse end edges 108 of the central body portion 90 rest on respective portions of top surfaces of first and second side cargo walls 24 and 26. The central body portion 90 also extends in a generally horizontal orientation between the first and second side cargo walls 24 and 26 in this work surface providing orientation. As indicated in FIG. 29, the first lateral body portion 92 is generally vertically oriented with the attachment assemblies 60 extending through the mounting structure 114 of the first lateral body portion 92. The work surface provided by the central body portion 90 can be used for tools or other work related uses. Further, the work surface provided by the central body portion 90 can be used to support the off-road vehicle V.

Second Embodiment

Figure 30:
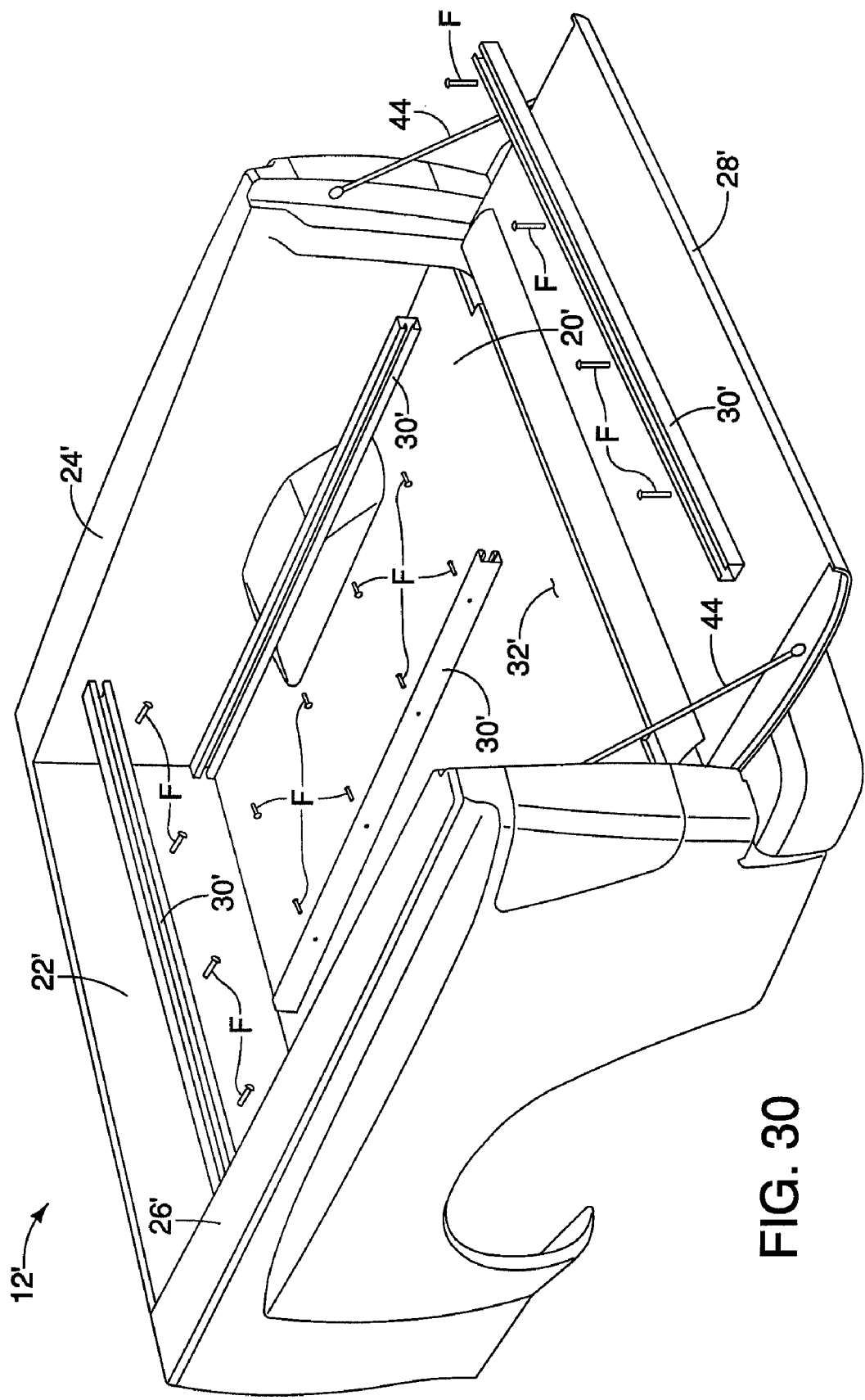
FIG. 30 is a perspective view of the cargo bed structure showing the tracks as separate members installed to various surfaces of the cargo bed structure in accordance with one embodiment of the present invention in accordance with another embodiment of the present invention.

Referring now to FIG. 30, a cargo bed structure 12' in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. The parts of the second embodiment that differ from the parts of the first embodiment will be indicated with a single prime (').

In the second embodiment, the cargo bed structure 12' is identical to the cargo bed structure 12 of the first embodiment, except that the cargo bed structure 12' is not provided with tracks 30' during factory assembly. The tracks 30' are identical to the tracks 30 of the first embodiment, except that the tracks 30 are manufactured for installation to a surface of a cargo bed structure, such as the cargo bed structure 12' at some point after completed manufacture of the cargo bed structure 12'. More specifically, a cargo bed floor 20', a front cargo wall 22', a first side cargo wall 24', a second side cargo wall 26' and a tailgate 28' do not initially include the tracks 30'. The tracks 30' are installed separately.

A plurality of tracks 30' are installed in, for example, an after-market installation process using fasteners F. Consequently, a pickup truck or cargo vehicle that is not originally provided with the tracks 30 can be provide with the tracks 30' and can utilize the cargo bed accessories 14 described above with respect to the first embodiment.

The various portions of the vehicle 10 apart from the cargo bed structure 12 and cargo bed structure 12' are conventional components that are well known in the art. Since various portions of the vehicle 10 are well known in the art, these structures will not be discussed or illustrated in detail herein. Rather, it will be apparent to those skilled in the art from this disclosure that the components can be any type of structure that can be used to carry out the present invention.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention.

The term "configured" as used herein to describe a component, section or part of a device includes hardware and/or software that is constructed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A multi-purpose vehicle cargo bed accessory comprising:
    a central body portion having a flat planar shape including a pair of opposed work surfaces defined by a first lateral edge, a second lateral edge and a pair of transverse end edges extending between the first and second lateral edges, the first and second lateral edges extending a lengthwise direction of the central body portion, the central body portion including at least one first mounting structure located between the first and second lateral edges and between the pair of transverse end edges thereby being confined within an area defined by the pair of work surfaces;
    a first lateral body portion having a flat planar shape extending perpendicularly from a first one of the work surfaces and rigidly connected along a majority of the first lateral edge of the central body portion such that the first lateral body portion extends in a lengthwise direction parallel to a lengthwise direction of the central body portion, the first lateral body portion including at least one second mounting structure located within an area confined by the flat planar shape of the first lateral body portion; and
    a second lateral body portion extending perpendicularly from an opposite one of the work surfaces and rigidly connected along a majority of the second lateral edge of the central body portion,
    each of the first and second mounting structures being configured and arranged to securely fasten the vehicle cargo bed accessory to a vehicle cargo area; wherein the cargo bed accessory is capable of being used as any one of the following: a device to secure cargo within the cargo bed; a ramp to the cargo bed; a cargo space divider; a tailgate extender; a device to increase the height of a sidewall of the cargo bed; and a cargo space shelf.

2. The multi-purpose vehicle cargo bed accessory according to claim 1, wherein
    the central body portion, the first lateral body portion and the second lateral body portion are separate members fixedly attached to one another.

3. The multi-purpose vehicle cargo bed accessory according to claim 1, wherein
    the central body portion and the first lateral body portion are formed as a homogeneous single unitary member.

4. The multi-purpose vehicle cargo bed accessory according to claim 1, wherein
    the central body portion and the first lateral body portion are separate members fixedly attached to one another.

5. The multi-purpose vehicle cargo bed accessory according to claim 1, wherein
    the first lateral body portion, the second lateral body portion and the central body portion are made with a non-corrosive material.

6. The multi-purpose vehicle cargo bed accessory according to claim 1, wherein
    the second lateral edge of the central body portion includes at least one elongated handle aperture.

7. The multi-purpose vehicle cargo bed accessory according to claim 1, wherein
    the first lateral body portion has a first overall length that is less than a second overall length of the central body portion, with the first overall length being determined with respect to a first direction and the second overall length being determined with respect to a second direction that is parallel to the first direction and the first and second directions being parallel to the first and second lateral edges of the central body portion.

8. The multi-purpose vehicle cargo bed accessory according to claim 1, wherein
the first mounting structure of the central body portion includes a pair of spaced apart keyhole shaped apertures extending through the central body portion.

9. The multi-purpose vehicle cargo bed accessory according to claim 1, wherein
the first mounting structure includes a pair of spaced apart keyhole shaped apertures extending through the central body portion and the second mounting structure includes a pair of spaced apart keyhole shaped apertures extending through the first lateral body portion.

10. The multi-purpose vehicle cargo bed accessory according to claim 1, wherein
at least one of the central body portion and the first lateral body portion includes a cargo tie-down aperture extending therethrough.

11. The multi-purpose vehicle cargo bed accessory according to claim 1, wherein
the central body portion includes at least one hook structure adjacent to one of the pair of transverse end edges.

12. The multi-purpose vehicle cargo bed accessory according to claim 1, further comprising:
an accessory mounting track configured for attachment to a surface of the vehicle cargo area, with at least one of the central body portion and first lateral body portion of the multi-purpose vehicle cargo bed accessory being configured and arranged to attach, detach and reattach to the accessory mounting track.

13. The multi-purpose vehicle cargo bed accessory according to claim 1, wherein
the first lateral body portion includes a first longitudinal edge having a first length and a second longitudinal edge having a second length longer than the first length, the first longitudinal edge and the second longitudinal edge being parallel to the first and second lateral edges of the central body and distal relative to the central body portion.

14. The multi-purpose vehicle cargo bed accessory according to claim 1, wherein
the first lateral body portion forms a generally T-shaped transverse cross section with the central body portion along a majority of the first lateral edge, and
the second lateral body portion forms a generally T-shaped transverse cross section with the central body portion along a majority of the second lateral edge.

15. The multi-purpose vehicle cargo bed accessory according to claim 1, wherein
the central body portion, the first lateral body portion and the second lateral body portion are formed as a homogeneous single unitary member.

16. The multi-purpose vehicle cargo bed accessory according to claim 15, wherein
the central body portion, the first lateral body portion and the second lateral body portion are formed of a high strength plastic material.

17. The multi-purpose vehicle cargo bed accessory according to claim 1, wherein
the first mounting structure of the central body portion includes a keyhole shaped aperture extending through the central body portion.

18. The multi-purpose vehicle cargo bed accessory according to claim 17, wherein
the keyhole shaped aperture includes a slot portion and a rounded portion, the diameter of the rounded portion being larger than the width of the slot portion.

19. The multi-purpose vehicle cargo bed accessory according to claim 18, wherein
the slot portion extends in a longitudinal direction relative to the central body portion.

20. The multi-purpose vehicle cargo bed accessory according to claim 1, wherein
the first lateral body portion forms a generally T-shaped transverse cross section with the central body portion along a majority of the first lateral edge, the first lateral body portion having a first longitudinal part extending perpendicularly from the first lateral edge of the central body portion and a second longitudinal part extending perpendicularly from a second side of the central body portion, and
the second lateral body portion forms a generally T-shaped transverse cross section with the central body portion along a majority of the second lateral edge, the second lateral body portion having a first longitudinal part extending perpendicularly from the second lateral edge of the central body portion and a second longitudinal part extending perpendicularly from the second side of the central body portion.

21. The multi-purpose vehicle cargo bed accessory according to claim 20, wherein
the first lateral body portion has an overall width measured from a longitudinal edge of the first longitudinal part to a longitudinal edge of the second longitudinal part defining a first distance, and
the second lateral body portion has an overall width measured from a longitudinal edge of the first longitudinal part to a longitudinal edge of the second longitudinal part defining a second distance,
the first distance being greater than the second distance, with the longitudinal edges being parallel to the first and second lateral edges of the central body portion and distal relative to the central body portion.

22. The multi-purpose vehicle cargo bed accessory according to claim 20, wherein
the first longitudinal part of the first lateral body portion extends away from the central body portion a first distance and the second longitudinal part of the first lateral body portion extends away from the central body portion a second distance that is less than the first distance.

23. The multi-purpose vehicle cargo bed accessory according to claim 22, wherein
the first longitudinal part of the first lateral body portion includes a first longitudinal edge having a first length and the second longitudinal part includes a second longitudinal edge having a second length longer than the first length, the first longitudinal edge and the second longitudinal edge being parallel to the first and second lateral edges of the central body and distal relative to the central body portion.

\* \* \* \* \*